United States Patent Office 3,476,206
Patented Nov. 4, 1969

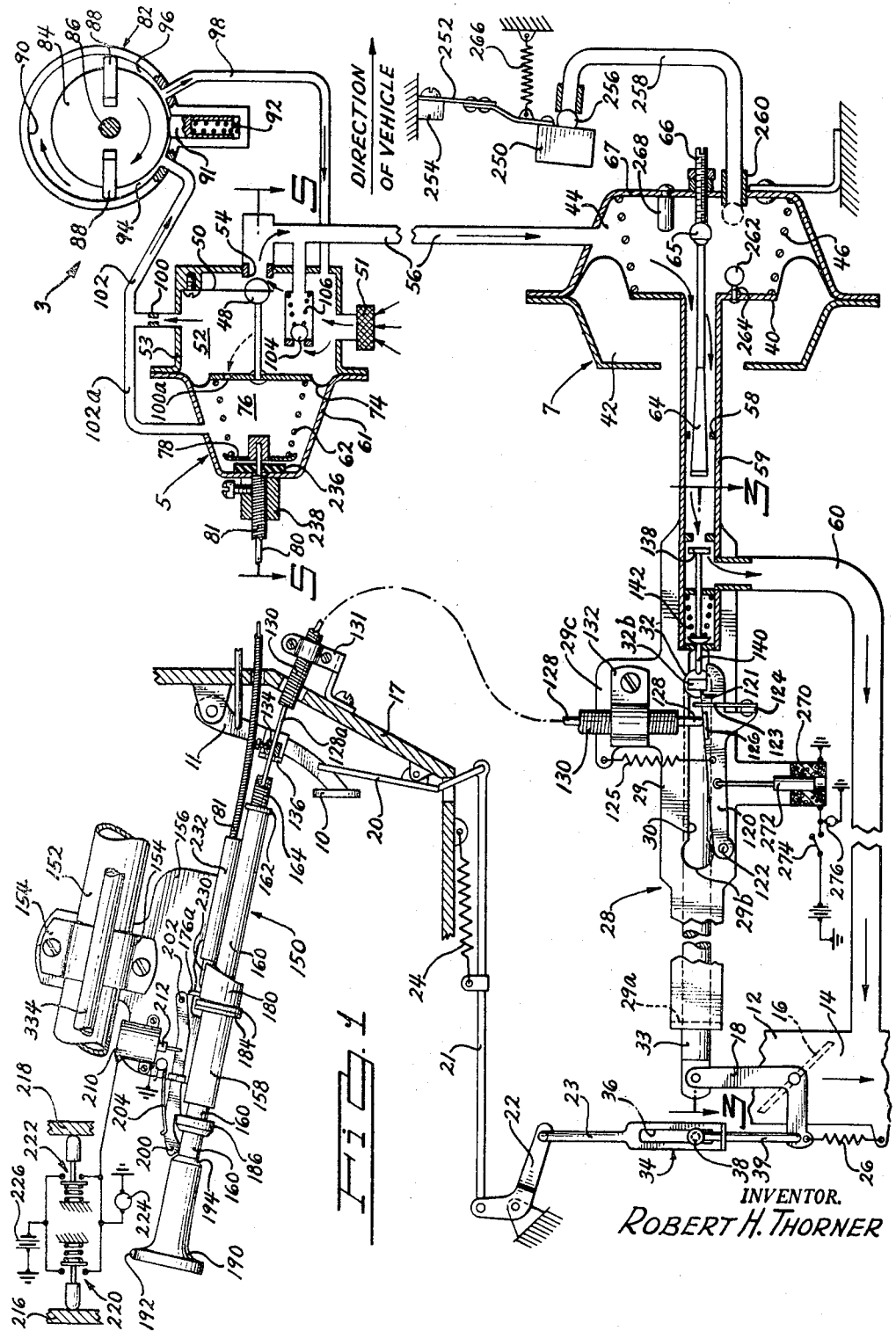

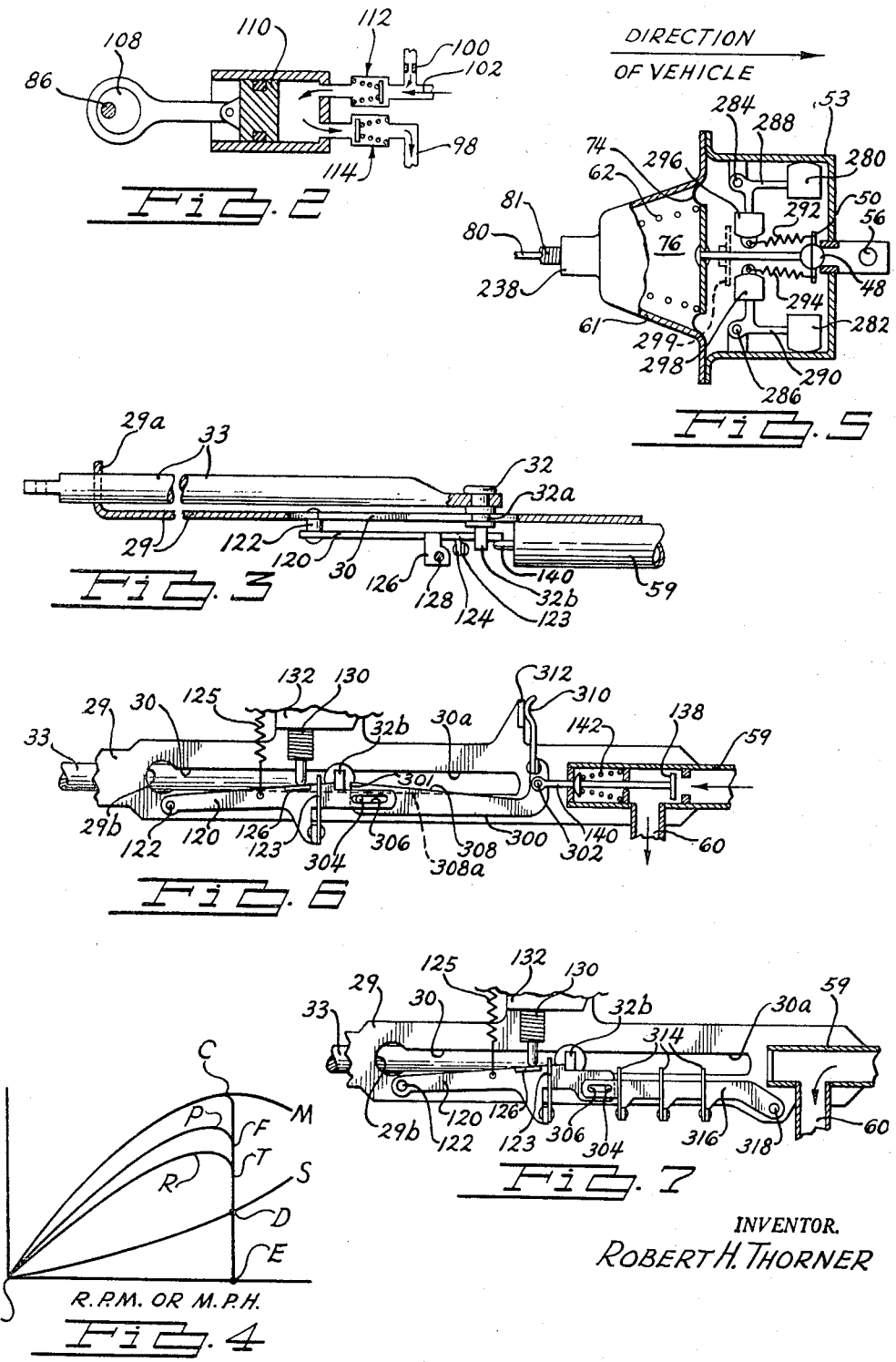

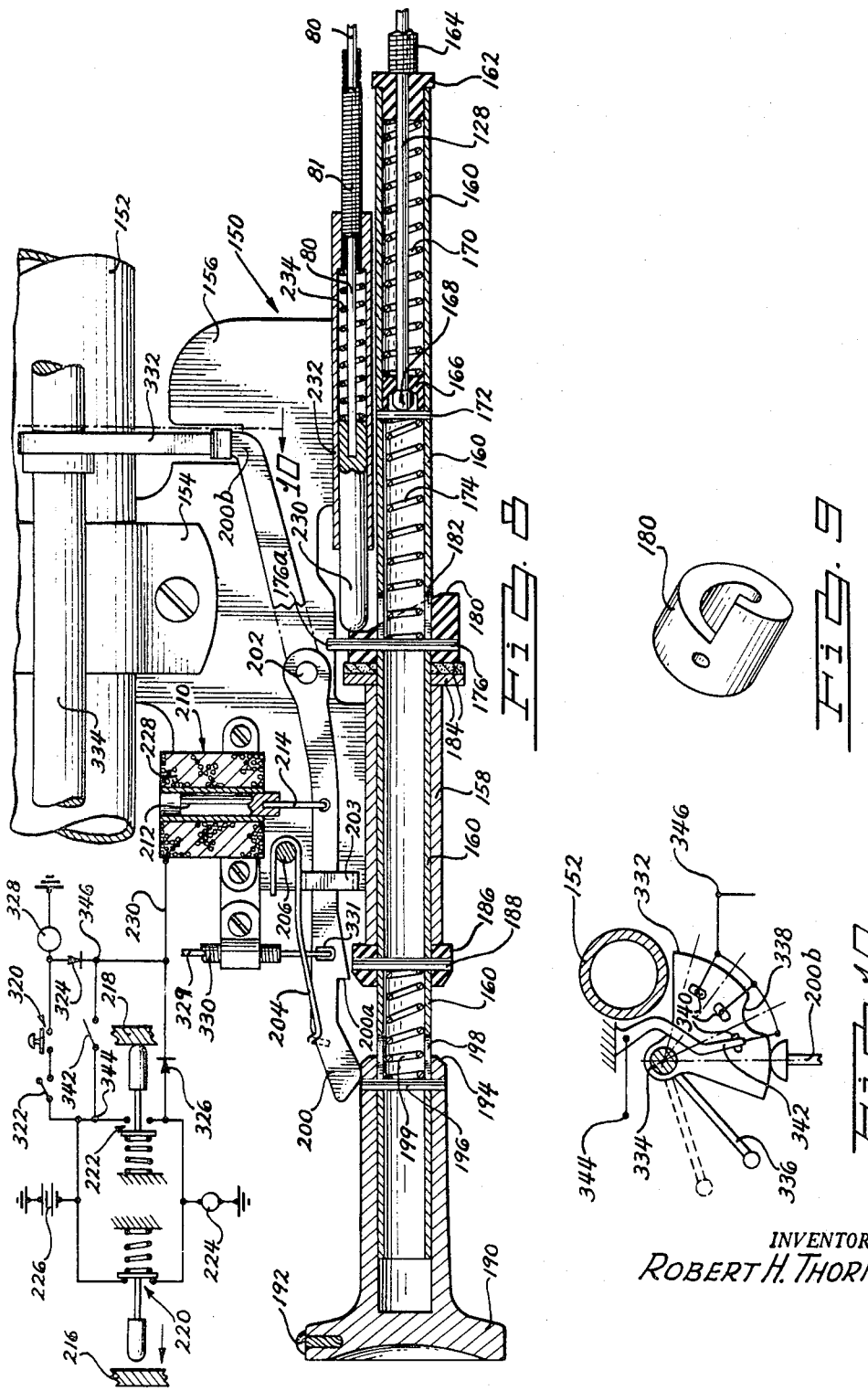

3,476,206
AUTOMOTIVE SPEED CONTROL APPARATUS
Robert H. Thorner, 8750–F W. Chicago Blvd.,
Detroit, Mich. 48204
Continuation-in-part of application Ser. No. 266,257,
Mar. 19, 1963. This application Dec. 9, 1966, Ser.
No. 600,507
Int. Cl. B60k *31/00*
U.S. Cl. 180—108                                     48 Claims

ABSTRACT OF THE DISCLOSURE

This patent discloses and claims a number of subcombination inventions disclosed in the parent patent. These subcombinations may be included in automatic cruise control for automotive vehicles to provide, either combined or separately, (1) means to cause an automatic reduction of speed when the vehicle traverses a road curve, and automatic return to the preset speed when the road straightens out, both for automatic-throttle operation and also for accelerator resistance operation; (2) accelerator resistance means to provide a very sudden application of the resistance force, and/or in which the resistance force may be pulsating; (3) means automatically to restrict the rate of automatic acceleration temporarily; (4) means to provide automatically an accelerator resistance force whenever the vehicle is accelerated by the vehicle-driver at an excessive or dangerous rate; and (5) means operated by the vehicle starter coil switch to render the regulator device inoperative until deliberately activated again by the vehicle-driver.

The present application is a continuation-in-part of Serial No. 266,257, filed March 19, 1963, now Patent No. 3,305,042 which in turn was copending with my following patent applications: Serial No. 712,847, filed Feb. 3, 1958, entitled "Control Apparatus for Motor Vehicle Regulator," now Patent 3,114,427; Serial No. 836,419, filed Aug. 27, 1959, entitled "Throttle Control Mechanism," now Patent 3,168,942; Serial No. 859,504, filed Dec. 14, 1959, entitled "Throttle Control Mechanism," now abandoned; Serial No. 74,315, filed Dec. 7, 1960, entitled "Speed Regulating Device," now Patent 3,153,325; Serial No. 82,769, filed Jan. 16, 1961, entitled "Speed Regulator Device," now Patent 3,213,691; Serial No. 118,-411, filed June 20, 1961, entitled "Throttle Control Mechanism," now Patent 3,168,933; and Serial No. 683,318, filed Sept. 11, 1957, now Patent 3,084,758.

This invention relates to a speed control mechanism or apparatus for "automatic throttles" as applied in automotive vehicles.

With the increasing use of non-stop highways, sometimes referred to as turnpikes, thruways, freeways, etc. there is an increasing need for an "automatic-throttle" for automotive vehicles. When an automobile is driven for long distances on these non-stop highways, the operator's foot and leg muscles become tired and strained due to the necessity of holding the accelerator in the various desired positions for long periods of time. A main purpose of all "Automatic Throttle" devices, as disclosed herein, is to enable the vehicle operator to drive without the necessity of holding his foot on the accelerator. Such devices are now believed to add safety in operating automotive vehicle for several reasons, as follows:

(1) Since the operator cannot change his body position, his muscles become strained. Such undesirable strain induces fatigue which in turn tends to reduce alertness in all emergencies and to produce drowsiness and sleep, and has resulted in a large number of accidents on these non-stop highways. This fact, which is contrary to first impressions, has been established in many tests and public use.

(2) When driving for long distances without stopping or slowing down in today's high powered cars, frequently the operator finds he has increased the vehicle speed excessively without realizing it.

(3) I have found by interrogation of hundreds of drivers that 60–70% have often used their left foot *on the accelerator* to alleviate the strain on their right foot and leg. This practice, of course, is extremely dangerous, and is eliminated by the use of these automatic speed control devices. Hence, one important consideration in these devices is safety; and it is highly desirable that nothing is included in the principle and design of such speed-control mechanisms which might be sufficiently hazardous to offset the inherent safety features above recited, so that a net gain in safety is realized.

Another very important consideration in the practical utilization of "automatic throttles" is convenience of operation. In order to understand this important aspect, it is necessary first to appreciate that all such automotive speed control apparatus or mechanism (including hand-throttle devices) comprise two basic means or components, and all such devices can be so classified as follows:

(1) *Speed-establishing mechanism.*—This is the means which sets or establishes the vehicle speed by regulation of the engine control means, and comprises two basic types:

A. *Automatic-speed establishment.*—In this type of device, the control means is operated by a speed governor mechanism or similar means tending *automatically* to maintain any desired speed selected by the vehicle operator regardless of load changes. The instant invention illustrates this type.

B. *Manual speed establishment.*—In this type of "hand-throttle" device the control means or throttle is held in any one of a plurality of fixed positions *manually* selectable by the vehicle operator to obtain the desired speed. With this type of manual speed setting device, the speed varies undesirably as the load changes at any preselected setting. The hand throttle device of my said patent application, Ser. No. 118,411 is an example of this type.

(2) *Selective control system.*—Both types of devices described above (automatic and manual) *must* have some kind of "Selective Control System" which provides the means, methods and procedures for effecting the desired operation thereof, and are disposed to perform at least the following:

A. To enable selectable operation of the engine control means, such as the carburetor throttle and accelerator, without the operator holding his foot on the accelerator.

B. To enable the vehicle operator to selectively establish the desired operating speed.

C. To enable instantaneous and unrestricted overriding of the speed control mechanism by depressing the accelerator for passing and a return to the preset condition when the operator's foot is removed from the accelerator.

D. To effect automatic, instantaneous and foolproof disengagement or inactivation of the speed control mechanism upon application of the vehicle brakes.

In the foregoing classification of all automotive speed control devices, it is important to appreciate that in a broad sense, the "Selective Control System" is separate from and independent of the type of speed-establishing means employed. Hence, whether a manual (hand-throttle) or automatic (governor) speed-setting means is provided, has no bearing on the quality and general utility of the particular selective control system employed. Accordingly, a control system including a hand-throttle may be better than the control system provided in a governor-type automatic speed control system. I believe this is the case with the "control system" for the hand throttle device disclosed in my said application, Serial Nos. 859,504, 836,419, and particularly 118,411 in relation to the control systems of all present automatic (governor type) devices now available, as will be discussed further herein.

The present invention is directed primarily to an improved "control system" for an automotive speed control apparatus, as above classified. While any suitable speed governor or regulator device may be used with my novel selective control system, certain features of the particular governor illustrated herein have great utility in combination with the control system which enhances the overall combination, to be discussed hereinafter.

In order to fully appreciate the present invention in view of the foregoing classification, it is necessary first to consider the present state of the art, including my own past efforts in this field. Accordingly the following discussion is based on the various modes of operation of past and present "control systems":

*Full lock out.*—With this type of control system, the device is rendered completely inoperative upon each application of the brake pedal, which has been done with two types of operation. (1) The operator can engage the device by pulling a knob, pushing a button, etc., *only after* the speed is actually attained. (2) The operator can manually set the knob, button, etc., at any time after starting the vehicle even before acceleration; and engagement can be effected after only partial travel of the accelerator, and the vehicle is then automatically accelerated up to the pre-set speed without further attention by the operator. To the best of my knowledge, this mode of operation with practical means for its accomplishment was first disclosed but not claimed in my said application, Serial No. 712,847 (governor type).

*Automatic engagement.*—With this type of control system, the knob, button, or the like, would be set only once each time an operator starts up the vehicle. After acceleration of the vehicle by the operator, the speed regulator mechanism engages automatically. The device is inactivated upon each application of the brake pedal, but is not rendered inoperative. The speed control mechanism is reactivated automatically upon normal acceleration of the vehicle following each depression of the accelerator, without requiring manual operation of the knob or button. Such automatic engagement of the type of speed control system disclosed herein was first disclosed, to the best of my knowledge, in my said application, Ser. No. 712,847, FIGS. 13 and 19 thereof. This automatic engagement feature has been taught with three modes of operation as follows:

(1) Some of the devices now on the market enable automatic engagement *only after* the vehicle speed has actually been attained. Hence, after each application of the brakes, the regulator device is inactivated; but the operator must wait until the set speed is actually attained again before he can remove his foot from the accelerator. This type of operation detracts from the utility of these devices for city and suburban driving, as will be discussed hereinafter.

(2) In several of my prior patent applications, I have disclosed means to enable selective automatic engagement or activation of the governor *followed by automatic acceleration* up to the preset governed speed; and such engagement or activation is automatically effected after the operator partially depresses the accelerator, so that engagement cannot be effected before the vehicle is moving. This mode of operation is by far the most useful, especially for city and surburban driving. The first disclosure of means providing the highly desirable type of control system as disclosed herein, to the best of my knowledge, is illustrated in my said application Ser. No. 712,847 in FIGS. 13 and 19. An improved and more complete disclosure of such control system means is disclosed in my said hand throttle application Serial No. 836,419, in FIGS. 9, 12 and 13; and is further and more completely disclosed in my other two hand throttle applications Serial Nos. 859,504 and 118,411. An improved control system providing this desirable action with a governor mechanism is disclosed in my two said applications, Ser. Nos. 74,315 and 82,769, to be discussed further hereinafter.

(3) In all the automatic engagement devices, as above discussed, after the brake pedal has been depressed and the operator wholly or partially shuts down the vehicle, means are provided to restrain the device to and in an *inoperative* position before and/or until the vehicle is again placed deliberately in operation by the operator. Such restraining means must be provided in order to require the driver to consciously initiate operation of the speed control device after he again uses the vehicle so that he is aware that the speed control device is operative. In some prior art devices, the ignition switch alone has been used for this purpose; however, if my automatic acceleration system is provided, ignition switch lockout by itself is not completely safe, because when the engine is idling and a new driver enters the vehicle, as at parking lots, he can be surprised by automatic engagement at speeds below the set speed. This problem is best overcome by utilizing the door-opening as a means of rendering the device inoperative; this door-sensing concept is disclosed first in the art to the best of my knowledge, in my said application, Ser. No. 118,411. I have found this restraining means to be completely safe in many years of actual tests and use by many people. A door-actuated restraining means is again disclosed in the instant case for use with governors having a particular type of selective control providing automatic acceleration, along with additional new restraining means, which could also be used with hand-throttles as well as governors.

*Brake release means.*—All speed control devices now on the market are released upon application of the brakes, which in turn directs secondary energy (such as electricity, vacuum or the stored energy of a spring) to effect the release. It is important to appreciate that any such speed control device has sole charge of the accelerator (and throttle) during automatic operation thereof. As discussed above, it is essential from a safety standpoint that all such devices be completely foolproof and reliable. Accordingly in many of my speed control devices, I have provided a positive mechanical release, whereby the operator physically forces a release directly by the force of his foot acting on the brake pedal. A positive mechanical release was disclosed in my Patent No. 2,917,142 for a hand throttle, and my first disclosure of a positive mechanical release with a governor type control is shown in said application 712,847. Improved positive mechanical release means are disclosed in the instant case. Also supplemental electric release means are illustrated herein, as was done in S.N. 712,847 in FIGS. 13 and 19. However, in the event that space limitations in the vehicle (or other factors) prevent installation of my positive mechanical release means, then it would be necessary to use the electric or equivalent release means shown herein or in FIGS. 13 and 19 of Ser. No. 712,847.

In this regard it is significant that all transmission controls in automobiles are manually operated. At least two leading automobile manufacturers use rugged flexible shafts for their push button transmission controls. One large automotive manufacturer used electric controls for a short time but discontinued them after a short life in favor of mechanical controls.

*Connection of governor to vehicle linkage.*—All present automatic speed control devices now on the market are connected directly to actuate the *entire* carburetor-throttle linkage. An important problem in the practical utilization of these automotive speed-regulating controls is that the automotive manufacturers prefer not to alter their standard accelerator-carburetor linkage to accommodate these devices. Hence, presently at least, a fundamental requirement for all these devices is that the "control system" be added or connected to the *existing* standard accelerator-carburetor linkage. Thus, it has always been necessary for the speed governor mechanism to provide sufficient force to operate without surging the *entire accelerator-carburetor* linkage mechanism (which includes automatic transmission controls in some vehicles). Anyone skilled in the art of governors is well aware of the difficulty of this requirement. Since a speed governor mechanism is a "closed-loop" or self-controlling mechanism, dirt, inertia, and especially friction in the system is extremely critical. This is true since it is not the *total* force of the speed sensing means which must overpower the friction and inertia forces of the accelerator-carburetor linkage—it is only the small *change* in forces accompanying a change in speed which is available to operate the accelerator-carburetor linkage mechanism. Even with a force-amplifying servo-mechanism, which appears to be essential, the friction and inertia of this entire linkage imposes limitations on the speed governor mechanism. It is necessary to make the servo-motor large enough to operate the entire linkage without hunting, which has frequently been a problem, particularly when the available pressure is limited. When the servo-motor is large enough to produce ample operating forces to minimize the friction and inertia forces, the time of response to a change in speed is longer, thereby tending to produce hunting or at least a sluggish action. If the servo-motor size is reduced to produce a faster response, then the tendency for the governor to lag or produce what is known in the art as "hysteresis" is increased; under these conditions there is a difference in the controlled speed when "loading" and "unloading" the engine, and/or there is a tendency to produce a "swing" or hunt before settling.

In view of all the foregoing, particularly when the source of energy for the servo-motor is limited, it is desirable to use the smallest possible servo-motor while providing stable governor action at all desired loads without hunting. I have disclosed in my said application, Serial No. 712,847 in FIG. 21, for the first time in the art to the best of my knowledge, a "double abutment" or "double override" mechanism which can enable a startling reduction in the size of the servo-motor and/or drastically reduce the forces required for a given size of servo-motor. With this construction, the governor mechanism *only* must operate the carburetor throttle (or equivalent) and its short actuating means, while being completely disconnected from the major portion of the accelerator-carburetor linkage itself. Since this latter linkage produces the largest part of the friction and inertia resistance forces, such drastic reduction in the required size and/or force of the servo-motor is made possible.

I have disclosed this double-override mechanism as an optional but important part of the control system of the present invention, which will be discussed further hereinafter.

*Speed warning means.*—Some of the automotive speed control devices, including the apparatus disclosed in my said application, Serial No. 712,847, have provided a speed warning means which is sensed by the operator's foot as sudden additional force acting on the accelerator. Such speed warning means utilizes the speed-responsive sensing means of the governor mechanism to produce such added accelerator resistance force (also referred to herein as "push-back" force). In this manner, the operator is warned by such "push-back" or added resistance force on the accelerator or its connected linkage mechanism that the desired speed has been attained or exceeded. Although this increased "push-back" force occurs fairly suddenly when the set speed is attained, it is still low enough that the operator may overpower the force by pressing hard on the accelerator to increase the vehicle speed any amount above the set speed.

In all speed control devices now on the market providing such speed warning means, the accelerator resistance force is produced under all driving conditions, even when the automatic speed regulator is disengaged. Means are disclosed in my said application, Ser. No. 712,847, for manually rendering inoperative the accelerator-resistance action; also in said application, I disclose means to use the servo-motor spring itself to provide the push-back force, which has particular utility when manifold vacuum is the source of energy. The first disclosure in the art of these two features was made in said application, Ser. No. 712,847, to the best of my knowledge. The "push-back" means has been intended, in all devices prior to Ser. No. 712,847 and prior to the instant case, solely as a speed warning means, and is equivalent to any of the audible speed-warning systems now on the market. As such, these speed warning means do not in any way effect the quality or utility of the governor or automatic-throttle action, which can be and is provided separately.

At the present time a difference of opinion exists regarding the utility of the push-back concept among those who have tested or owned devices including such speed warning means. In a survey of many automobile people, and also purchasers of these devices, almost all were quite enthusiastic about the "automatic throttle" governor control, but only about one-half liked the accelerator-resistance speed-warning action. Most of the remaining half strongly opposed the use of accelerator-resistance force as "annoying." They object to any force in the way of normal operation of the accelerator. The instant case discloses a speed control apparatus which is sufficiently versatile to provide any action desired by the public including new actions to be discussed hereinafter.

A main object of the present invention is to provide a control system for an "automatic-throttle" governor or speed regulator mechanism in an automotive vehicle which is simple, reliable and safe, and provides an improved method and means for controlling the system while overcoming the objections above recited; and which control system is extremely adaptable and versatile in its ability to provide different actions, as may be desired.

I have found that the automotive speed apparatus disclosed herein is very useful for city and suburban driving, particularly between the "rush hours" of traffic. At the present time in all cities, there is a tremendous suburban growth. For traveling to these suburbs, fast roadways are being provided which comprise freeways in large metropolitan areas, and in smaller communities comprise fast streets and boulevards which are available or under construction. My control system disclosed herein extends the use of such "automatic throttle" operation to such city and suburb driving.

A very important object of the present invention is to provide a control system for an "automatic throttle" governor or speed regulator mechanism in an automotive vehicle, as recited in the preceding object, which requires the operator to *partially* advance the control means in order to effect engagement or operation of the speed governor mechanism; and wherein such engagement is indicated to the operator by signal means dependent on the senses of sound and/or touch, and he then can remove his foot from the accelerator substantially before the set speed is attained; and thereafter the speed control apparatus effects automatic acceleration of the vehicle up to the preset speed, and such speed is automatically maintained thereafter in all vehicle attitudes.

In the automatic acceleration feature of the present invention as stated in the preceding paragraph, when an automatic speed governor mechanism uses electricity or high-pressure fluid for the servo-motor, a high rate of acceleration is produced which is hazardous. In my hand throttles such as disclosed in said applications Ser. Nos. 836,419 and 118,411, the rate of automatic acceleration is inherently slow and hence I have found such devices to be completely safe for automatic acceleration. My said applications. Ser. Nos. 74,315 and 82,769, disclose automatic acceleration which is effected after partial advancement of the control means. Means are disclosed therein to restrict or retard the rate of automatic acceleration comparable to the inherent rate of automatic acceleration with my hand throttle devices.

Another important object of the present invention is to provide an automotive speed control apparatus including a control system, as above recited, and also an automatic speed regulating mechanism, in which novel means are provided utilizing an inherent characteristic of manifold vacuum (of a carbureted internal combustion engine) to effect a restricted or safe rate of automatic acceleration.

Another important object of the present invention is to provide an automotive speed control apparatus including a control system, as recited in the second preceding paragraph, and also a speed regulating mechanism, in which novel means are provided to retard or restrict the rate of automatic acceleration upon engagement of the speed regulating mechanism and become ineffective upon attaining the preselected speed after said automatic acceleration.

Another object of the present invention is to provide a control system for an "automatic-throttle" speed regulator mechanism in an automotive vehicle, as recited above, which preferably, but not necessarily, includes positive mechanical means to inactivate the automatic speed regulating mechanism operation by actuation of the brake pedal in a manner to restore the automotive vehicle to completely normal operation as effectively as though the entire automatic speed regulating mechanism were removed from the vehicle but ready for activation; and the automatic regulator device may be re-activated by again partially advancing the control means as stated above.

Another object of the present invention is to provide an automotive speed control apparatus including a control system, and an automatic speed regulating mechanism of the type described in the preceding paragraph in which restraining means are provided operable, in one form, upon opening the vehicle door to render the automatic speed regulating mechanism inoperative until deliberately activated by the vehicle operator after entering the vehicle and closing the door; and in other forms such restraining means may be combined with or be separately operable by the vehicle-starter switch and/or the transmission manual control lever, or any other such vehicle element normally operated manually by the vehicle operator incident to inactivation (or activation) of the vehicle and particularly when the driver leaves the vehicle.

Still another object of the present invention is to provide an automotive speed control apparatus which may include a selective control system and an automatic speed-regulating mechanism, in which improved and simple means provide a selectable speed-warning system in the form of a sudden and appreciable increase in the resistance or "push-back" force of the accelerator pedal so that the driver's foot senses this increased resistance as a warning that the vehicle speed has reached the value preset by the driver; and wherein the added accelerator pedal resistance is low enough to permit the driver to force the accelerator to any wider open throttle position if necessary in emergencies despite this added warning force; and wherein the automatic speed-regulating mechanism is automatically inactivated as an automatic throttle upon application of the vehicle brakes while said accelerator resistance remains operable for use in normal driving as a speed warning means.

A further object of the present invention is to provide an automotive speed control apparatus which may include a selective control system and an automatic speed-regulating mechanism in which the accelerator resistance means recited in the preceding paragraph is also automatically rendered operative whenever the vehicle-driver depresses the accelerator sufficiently to cause excessive acceleration, to provide the resistance warning force at all rates of acceleration above a predetermined rate for inducing the driver to limit the rate of acceleration to a moderate and safe value.

The operation of vehicles on highway curves, when equipped with any of the above classified automotive speed control apparatus, whether they include manual (hand-throttle) or automatic (governor) speed establishing means, has been criticized sometimes from a safety standpoint. When a vehicle approaches a curve (which is not suitably banked) at a set speed of 65 m.p.h. for example, frequently the driver is so comfortable with his foot off the accelerator that he does not touch the brake (when he should) to release the means holding the accelerator or engine control means. As a result the vehicle traverses the curve at a speed higher than a safe value. This condition appears to be more prevalent when the speed should be reduced only about 5–10 m.p.h., for example.

An important object of the present invention is to provide an automotive speed control apparatus which may include a selective control system and an automatic speed-regulating mechanism, in which curve-compensation means are provided to sense the centrifugal force of the vehicle when traversing highway curves in either a left or right direction, which curve-compensation means effects automatically a reduction of vehicle speed from the set speed as a function of the increase in highway or road curvature (radius decreases), and to automatically return the vehicle speed to the preset value as the curvature returns to a straight road; and further to provide that such curve-compensation is also operative for accelerator resistance (push-back) action.

Another important object of the present invention is to provide an automotive speed control apparatus as recited in the preceding paragraph which also includes the means described in another earlier paragraph providing a speed-warning system in the form of a sudden increase in the resistance force of the accelerator pedal so that the driver's foot senses this increased resistance as a warning that the vehicle speed has reached the value preset by the driver, and further providing that the curve-compensation means causes the speed at which such resistance warning force occurs to diminish gradually as the radius of highway curvature decreases (an increase in road curvature), and to return gradually to the straight-road speed as the road curvature gradually decreases to a straight road.

Another object of the present invention is to provide in a control system for "automatic-throttle" operation in an automotive vehicle, and including a speed governor mechanism, novel means to permit actuating only the control means of the engine independently of the accelerator and linkage therefrom, but providing normal operative connection of the accelerator and engine control means when the governor mechanism is effectively inactivated.

A further object of the present invention is to provide a control system for an "automatic-throttle" mechanism in an automotive vehicle as recited in the foregoing paragraphs in which all of the control functions or operations may be accomplished by various movements of a single knob or dial, and to include tactile indicating means, if desired, so that only the sense of touch is required by the operator without removing his sight from the road.

Other objects of the present invention are to provide: an automatic speed control apparatus including a control system and an improved automatic speed governor mechanism per se, having greater simplicity and stability, and including novel means to generate a pressure as a function of vehicle (or engine) speed; and novel means to shut off the airflow of such governor mechanism when an air operated servo-motor is used.

Further objects and advantages of the invention will be apparent from the following description, taken in connection with the appended drawings, in which—

FIG. 1 is a somewhat diagrammatic view of a complete installation of one form of automotive speed control apparatus of the present invention mounted in an automotive vehicle and showing the cooperation of the control system and an automatic speed regulating mechanism;

FIG. 2 is a somewhat diagrammatic view of a modified form of pressure generator means;

FIG. 3 is a fragmentary elevational view with parts in section of a portion of the override mechanism or unit as viewed along the line 3—3 in FIG. 1;

FIG. 4 is a graph showing typical power curves of an engine and various governor operational curves;

FIG. 5 is a diagrammatic view of a modified form of a portion of the speed governor mechanism taken along the line 5—5 in FIG. 1, and illustrating the means for automatically effecting a reduction of the governed speed on highway curves, and also illustrating a modified means for retarding the rate of acceleration;

FIG. 6 is a modified form of override mechanism or unit illustrating a detent means for providing accelerator resistance only when the "automatic-throttle" action is in operation;

FIG. 7 is a modified form of override mechanism or unit illustrating means for providing only the automatic throttle action without accelerator resistance at any time, and including audible signal means;

FIG. 8 is an enlarged fragmentary and partial sectional view of the selector mechanism or unit disclosed in FIG. 1, and illustrating several modified restraining means operable by the door and/or the starter switch and/or the transmission control lever;

FIG. 9 is a perspective view of the speed-adjusting cam illustrated in FIGS. 1 and 8;

FIG. 10 is a diagrammatic view of a transmission control means taken along the line 10—10 of FIG. 8, and also illustrating still another form of restraining means operated by the transmission control.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

It is also to be understood that the present invention may be used in any kind of highway or road vehicle such as for automobiles and trucks, and may control any kind of engine therein such as an internal combustion gasoline engine or diesel engine, a gas turbine, etc. The control system may also be used with any suitable speed governor mechanism or equivalent, or with any other kind of mechanism tending to correct throttle position in any desired manner.

CONSTRUCTION

The form of the invention illustrated by the automotive speed control apparatus shown in FIG. 1 will first be explained from a constructional standpoint before discussing the operation. The speed-regulating (governor) mechanism will first be explained in its automatic operation of the control means; and then the selective control system will be discussed. The various components illustrated in FIG. 1 are shown in working cooperation primarily for ease of understanding and are not necessarily shown in true proportion.

*Speed governor mechanism.*—The speed regulator mechanism illustrated in FIG. 1 includes three basic components or units, as follows: a sensor or pressure generator unit, generally indicated by the numeral 3; a brain unit, generally indicated by the numeral 5; and a servo-motor unit, generally indicated by the numeral 7. In addition to its construction, the operation of the governor mechanism also will be briefly described in this section to render the "Overall-Operation" section easier to understand.

In FIG. 1 there is shown a conventional brake pedal 10 supported by an arm 11 and carburetor 12 in an engine intake passage or manifold 14 and including a control member such as a throttle 16 with a bellcrank lever 18, operated by an accelerator 20 through linkage elements 21, 22 and 23 all biased in the idle-speed direction by an idle spring 24 and a lever spring 26, to be discussed hereinafter. The lever 18 and throttle 16 are operated by the speed regulator mechanism through an override or lost-motion unit 28 having a base member 29 including a slot 30 cooperating with a pin 32 carried by a link 33 operatively connected to lever 18. In the form shown, the accelerator linkage engages lever 18 by means of a second override or lost-motion unit 34 having a slot 36 cooperating with a pin 38 carried by a link 39 operatively connected to lever 18.

The override unit 28 is actuated by a pressure responsive member of the servo-motor 7, such as a diaphragm 40 having atmospheric pressure on one side thereof in a chamber 42 and vacuum on the other side thereof in a chamber 44. The vacuum-derived force of diaphragm 40 is biased or opposed by a servo-spring 46 which tends to close the throttle 16 when the regulator is in operation. The vacuum in chamber 44 acting on diaphragm 40 is modulated by pilot means such as a pilot valve 48 of the brain unit 5 supported for frictionless movements at one end of a leaf spring member 50, which leaf member is rigidly mounted at its other end to a fixed portion of the vehicle by suitable means, as by a screw. The pilot-valve controls a fluid circuit in which air from the atmosphere passes through a filter 51 into a chamber 52 and then flows through an inlet orifice or restriction 54, a conduit or passage 56 which is in open communication with chamber 44 (preferably made of synthetic rubber tubing), then through an outlet orifice or restriction 58 carried by a tube 59 secured to diaphragm 40 and movable therewith, and out through a conduit or passage 60 to the intake manifold 14 without further restriction. Hence, in this form of the invention, air is motivated by manifold vacuum as a source of energy. The passage 60 is preferably made of synthetic rubber tubing to accommodate movements of the servo-diaphragm 40 and tube 59.

The pilot valve 48 may assume any suitable contour, but in the form shown, a ball valve is held in alignment by leaf spring 50 and is biased in a closing direction by a speeder-spring 62 for cooperation with restriction 54 to vary the aperture thereof.

The pressure (vacuum) in passage 56 between the two restrictions 54 and 58 is applied to diaphragm 40. A tapered reset valve 64 may be provided and is effective upon movements of diaphragm 40 and throttle 16 (which moves tube 59 with its restriction 58) to vary the aperture thereof as a function of the position of the throttle. The valve 64 is restrained in a fixed axial position, and may be connected to a cover or housing 67 by any suitable universal joint means, as by a ball and socket 65. The socket includes a threaded portion 66 cooperating with mating threads secured to the cover 67. Adjustment of valve 64 by the screw 66 changes its effective relationship with the throttle 16, to provide speed-droop control.

When the pilot valve 48 is held closed by speederspring 62, substantially the full manifold vacuum exists in conduit 56 and chamber 44. When the pilot valve progressively is moved from its seated position to its full open position, by means to be discussed, the vacuum in conduit 56 and chamber 44 is modulated and *gradually* reduces to a value enabling full leftward travel of diaphragm 40. The maximum diaphragm vacuum obtainable in chamber 44 during regulator operation, such as 5 to 7 inches of mercury for example, is established when the diaphragm 40 overpowers the force of spring 46 to advance throttle 16 until the vacuum reduces enough to balance the spring. For the same reason, the *minimum manifold* vacuum obtainable in the engine during regulator operation is substantially the same as this *maximum diaphragm* vacuum. As valve 48 gradually opens to reduce the vacuum in chamber 44 from this maximum value, diaphragm 40 gradually moves to the left as a function of the travel of valve 48 to the left, and conversely, as shown in FIG. 1.

A pressure-sensitive member, such as a sensing diaphragm 74 in the brain unit, provides forces acting on the pilot valve in response to vacuum transmitted from the sensor unit to a chamber 76 fromed by a cover 61 and diaphragm 74, which transmitted vacuum varies as a function of vehicle (or engine) speed in a manner to be described. The forces of diaphragm 74 are opposed and balanced by spring 62 which is manually adjusted by axial movement of a spring retainer 78 operated by suitable shaft means (inserted through a seal 236), such as a flexible shaft 80 controlled by the operator and slidable in a sheath 81, to be discussed further.

In the form of the invention illustrated in FIG. 1, the diaphragm 74 also comprises in effect a second substantially frictionless supporting member for the pilot valve 48 acting in parallel with the leaf spring supporting member 50 to enable substantially frictionless operative speed-responsive movements of the diaphragm and pilot valve. The pilot valve 48 includes a stem-member having substantially frictionless operative connection with the diaphragm 74, as illustrated, to provide the said substantially frictionless cooperative movements. Valve 48 is sufficiently remote from diaphragm 74 that any misalignment of the valve due to the slight flexibility of the diaphragm is negligible, so that any valve contour may be used.

In the specification and claims herein, the supporting leaf spring, the spring 62, the diaphragm 74 and the operative connections thereof, which are associated with the speed-sensing and valve elements of the air circuit, are referred to "substantially" as frictionless. These elements, including the leaf spring support, actually are *completely* frictionless from a practical standpoint, since in extensive tests of the pilot-valve action by itself when supported by the leaf spring means, *no lag or hysteresis* could be measured that would adversely affect the governing action. Any intermolecular friction in the spring material itself can, of course, be disregarded since it is immeasurably small. The term "substantially" has been used solely in recognition of this minute intermolecular friction.

The signal unit or pressure generator 3, is shown as an example of means for producing a vacuum in chamber 76 that varies as a function of vehicle speed in this instance. The pressure generator includes rotary, positive displacement, air pumping means, such as a vane pump, generally indicated by the numeral 82. The pump includes a concentric rotor 84 driven by the conventional speedometer shaft 86 (not shown), or by other suitable rotary drive means and revolving a pair of vanes 88 slidable radially to ride against an eccentric cylinder 90. The vanes are urged against the cylinder by centrifugal force and, if desired, by conventional spring means. As illustrated, movement of the vanes 88 produces a vacuum in a chamber 94 and the air exhausts through a chamber 96 and a passage 98 to substantially atmospheric pressure in chamber 52. A novel sealing vane 91 is held against the surface of the rotor by spring means 92 to take up clearance for avoiding close production fits in separating chambers 94 and 96. The vacuum in chamber 94 causes air to flow through filter 51, chamber 52, and through a bleed restriction 100 into passage 102 which communicates with chamber 94, and with chamber 76 through branch passage 102a. The *combination of* these air passages and the restriction 100 and pumping means 82 all taken together comprise the "pressure generator" to produce a vacuum, in this instance, acting on diaphragm 74 that varies with vehicle speed. As the rotary speed of the vanes increases, the vacuum increases functionally as air bleeds through restriction 100, and conversely. By venting chamber 96 to chamber 52 through passage 98, the pressure differential acting on the sensing member (diaphragm 74) is substantially independent of the pressure drop through filter 51, as disclosed previously in my Patent No. 2,887,998 for a vacuum-sensing speed governor.

In order to consider the speed regulating action, assume temporarily that tube 59 is connected to operate link 33 as though secured together. The speed-regulating action of the governor mechanism described thus far is as follows: When the rotary speed of the vehicle and vanes 88 increases, which increases the vacuum in chamber 76, diaphragm 74 pulls the pilot valve 48 to the left against spring 62 to open the restriction 54 gradually as the speed increases. This action decreases the vacuum in chamber 44 in a manner previously described, so that spring 46 retards throttle 16 tending to restore the regulated speed. When the vehicle (or engine) speed decreases, the regulating action is the reverse of that above described, to advance the control means and restore or maintain the governed speed.

The diaphragm 40 and spring 46 are selected to hold the throttle at its maximum opening at the highest practical *diaphragm* vacuum such as 5–7 inches of mercury in passage 56 and chamber 44. As previously described, the necessary diaphragm vacuum is determined by the force of spring 46 and the size of diaphragm 40. It is desired to use as high a diaphragm vacuum as possible, which might be termed the "critical vacuum," in order to provide sufficient force to operate the throttle and any associated linkages. However, as the total available *manifold* vacuum tends to fall below this critical value (as when ascending steep hills) the throttle gradually is retarded by diaphragm 40 to maintain this vacuum (while the pilot valve is closed by diaphragm 74 "trying" futilely to increase the diaphragm vacuum) so that the desired regulated speed cannot be maintained thereafter. Thus the maximum diaphragm vacuum must be chosen to compromise these opposing factors. As the pilot valve 48 opens when the manifold vacuum is above the critical value, the diaphragm vacuum gradually is reduced from its maximum as above noted by movement of the pilot valve to an amount which enables spring 46 to retard throttle 16 as required. Hence the servo-motor will not start moving to the left, as viewed in FIG. 1, until the vacuum in chamber 44 is reduced by movement of pilot valve 48 to be less than the value of this critical vacuum. Thus if the spring 46 is selected to enable the governor mechanism to maintain the governed speed at 5 inches of mercury, for example, the size of diaphragm 40 would cause it to start moving at a lesser vacuum, such as 4¾ inches of mercury, for example when the pilot valve starts to open. The full leftward travel of diaphragm 40 to close throttle 16 might be effected when the pilot valve opens enough to produce a still lesser vacuum, such as 2½ inches of mercury, for example, determined by the rate of spring 46. The foregoing concept is utilized in a novel manner to facilitate automatic activation of the governor action, to be discussed further hereinafter.

When the operator accelerates the vehicle at a moderate rate with the throttle producing a higher manifold vacuum, such as 12–14 inches of mercury, for example, this full vacuum would act on the exposed portion of the pilot valve and might delay its opening slightly to a higher speed than selected. If desired, a relief or regulator valve 104 which is biased by a light spring 106 is set to open at a manifold vacuum of about 6–7 inches of mercury, with the foregoing example, for limiting the vacuum in passage 56 and chamber 44 to this value by bleeding air thereto. This vacuum is high enough to hold diaphragm 40 in its extreme right position until the pilot valve opens.

While any governor mechanism may be used with my novel control system, the particular speed regulating mechanism above described has great utility in the combinations disclosed herein. Also, this particular speed regulating or governor mechanism may include other types of pressure generators, such as the vacuum generator disclosed in FIG. 1 of my said application, Ser. No. 82,769. However, the particular pressure generator combination 3 disclosed in the instant case has great utility and is novel in the environment of an automotive speed-control apparatus and in combination with the other elements of a servo-type governor mechanism arranged in a particular manner as disclosed herein.

In order to understand the utility and novelty of the pressure generator 3 disclosed in FIG. 1 in combination with other elements comprising a speed governor mechanism and in the automotive speed control environment, it is first necessary to understand the existing problems, and how this unique combination solves these problems.

It has been explained that since these speed control devices must operate the entire accelerator-carburetor linkage, a servo-type governor must be employed to provide ample forces, since a direct-acting governor could not supply adequate forces when driven from the speedometer shaft. Even with a small rotary sensor device producing a signal amplified by a servomechanism, the added load on the speedometer shaft must be considered. This is significant, since automotive engineers frequently have trouble with the normal loads imposed on standard flexible speedometer shafting by bends and the friction thereof. Hence any speed-sensing device inserted in the speedometer shaft (between its drive and the speedometer) must add very small loads of friction and inertia to the already-burdened normal speedometer shaft. Accordingly, all skilled workers in this art who have offered practical devices acceptable to the public have included "servo-mechanism" type governors in which the speed sensing means which is driven by the speedometer shaft only controls a separate source of power or energy such as vacuum or electricity, which in turn performs the work of moving the throttle and its accelerator-linkage.

One problem in employing a dry air-pump of the rotary-vane type is that the rotary speed is very slow (1500 r.p.m. at 90 m.p.h.); and the pump being positive displacement, may be very small such as 1½ inch diameter, for example, in order not to overload the speedometer shaft. Since a continuous air circulation is necessary, any contaminants would deposit in any kind of oil lubricant-seal if provided, thereby adding to the shaft load. Hence, it is preferable to operate the pump dry, but then the leakage problem is critical. A dry vane pump of such small size and low speed normally would require very close fits, thereby rendering the pump too costly. The most critical parts are those concerned with sealing the rotor 84 in relation to the cylinder 90; this normally requires extremely close alignment of the shaft 86 in relation to the diameters of the rotor 84 and cylinder. The sealing vane 91 permits molding the parts without critical fits. This is accomplished by making the diameter of the rotor and the location of the bore of shaft 86 to provide the minimum possible clearance between the rotor and cylinder diameters without requiring machining after molding. This clearance might be .008–.015", for example. Then the vane 91 rides on the surface of the rotor to seal chamber 94 from chamber 96. The molded vanes, rotor and cylinder 90 can all be finished, if necessary, only on their end surfaces; such machining operations are fast, accurate and of low cost, which may comprise milling, or merely sanding. The sliding ends of vanes 88 should have the same radius of curvature as the surface of rotor 84 so they pass vane 91 smoothly.

The reason that this type of pump can be used as part of a pressure generator in this environment is that its sole purpose is to generate pressure and not to move a fluid, which is the usual purpose of a pump. The air-bleed provided by restriction 100 is made as small as possible and is only necessary to provide a speed-pressure "curve" in which any change of vacuum is sufficiently fast (as the vehicle speed changes) to provide stable governor operation. Even with the structure above described, there is a slight bleed past vanes 88, but a controllable additional bleed is desirable and is provided by restriction 100. This restriction can be varied in production to provide consistent speed-pressure curves regardless of minor production variables in the pump 82. The restriction 100 could be optionally provided in diaphragm 74 as illustrated as orifice 100a so that the branch passage including restriction 100 could be omitted. Actually, the orifice 100 might take the form of a controlled notch in the vanes 88 so that orifice 100 or 100a would not be necessary, and only static vacuum would be transmitted through passage 102 to chamber 76.

It has thus been shown that the sensor pump disclosed herein has utility, per se, primarily in its application as a part of a pressure generator, wherein it is used to generate a pressure that varies as a function of vehicle (or engine) speed, and wherein the air-flow is not important except to enable sufficiently rapid change of pressure. The utility of this construction is that liquids are not necessary in developing pressure; also the structure is inherently simple lending itself to low cost manufacture without close fits; and also the driving torque does not add excessive loads to the speedometer shaft.

FIG. 2 illustrates another pressure generator employing a displacement air pump comprising an eccentric 108 driven by shaft 86 to reciprocate a piston 110, or other pressure producing member such as a diaphragm; this action draws in air through restriction 100 and through a spring-loaded inlet valve 112, and exhausts the air through a spring-loaded outlet valve 114 to the return passage 98. This pressure generator produces a vacuum in passage 102 (which is applied to diaphragm 74) that varies as a function of speed. This form of sensor pump is simple, easy to seal, and has extremely long life; but the piston produces air pulsations. However, if the leakage of the novel vane-type sensor pump is within acceptable limits, this rotary pressure generator is preferred because of its inherent smoothness.

*Override means.*—The forces developed by the servomotor 7 of the speed governor mechanism and transmitted by the output shaft member, tube 59, are applied to the control means by the novel governor override or lost-motion unit 28, as discussed briefly above. The term "control means," as used herein, comprises primarily the engine control member, such as throttle 16, and also includes any elements movable with the control member, such as lever 18 and link 39. At any time that the accelerator and its linkage *operate* along with the engine control member (as if operatively connected thereto), then under these conditions these elements may also be considered to be included in the term "control means."

The governor override means 28 or unit illustrated in FIG. 1 basically comprises two relatively slidable members that support each other for such relative movements; and the support is effected by the two members having guiding contact at (at least) two spaced points. In the example illustrated in FIGS. 1 and 3, link 33 projects through a hole in a right-angle tab 29a of base member 29 for sliding movements relative thereto, which is one point of support. Also, the pin 32 which is secured to link 33 by suitable means, as by upsetting, includes a peripheral groove 32a (FIG. 3) which enables the pin to be slidably guided in the slot or track 30. This pin comprises a second point of support. The base member 29 includes a circular opening 29b at the end of slot 30 through which the pin 32 is inserted during assembly for engaging the slot 30 at groove 32a. Hence, the tab 29a and pin 32 provide at least two spaced points of support enabling the relative sliding movements of member 29 and link 33 so that the override assembly may be connected to the control means as an integral self supporting unit. Hence, when the link is hinged at lever 18 at one end, it operates as though it comprises a shaft connection to, and supported by, the diaphragm 40 at the other end.

The pin 32 includes a stop or tab 32b extending therefrom (FIG. 3) which cooperates with an override detent 120 including a catch 121 operatively connected to base member 29 by a hingepin 122 for angular movements in relation to the base member. The detent may include a swingable "clicker" leaf spring 123 secured at one end to a support 124 which may be a bent projection of the detent 120. A light extension spring 125 connects detent 120 to an extended portion 29c of the base member to urge the detent upwardly for cooperation with the stop 32b in a manner to be described. The detent includes a tab 126 for abutment by the end of a flexible shaft 128 sliding in a sheath 130. One end of the sheath is secured to a portion of the vehicle, such as to the floorboard 17, by a clamp 131. The other end of the sheath is secured to the extended portion 29c by a clamp 132 so that this end of the sheath (and shaft 128) are carried by and movable with base member 29 and tube 59 during all speed-regulating movements of diaphragm 40. The sheath and shaft are made long enough, preferably including a bend, to facilitate these movements. The flexible shaft carries a plug 134 secured thereto, as by a screw, disposed to contact at certain times to be discussed a release bracket 136 secured to the brake arm 11. The bracket 136 includes a slot or other suitable aperture to clear the shaft 128 while abutting the plug 134 such that any depression of the brake pedal 10 forces detent 120 completely clear of stop 32b.

A shut-off valve 138, which can serve two functions to be described, is operated by a guided stem 140 biased open by a spring 142 providing a light force (only to overcome friction). During "automatic-throttle" operation, the valve is completely open and offers no restriction to the flow of air through the circuit previously described.

*Selector unit.*—A selector unit 150 is provided to perform several functions, as follows: (1) to enable manual and (under certain conditions) automatic control or adjustment of detent 120 by controlling the position of flexible shaft 128; and (2) to enable manual selection of the vehicle speed by varying the force of spring 62 through shaft 80. Accordingly, detent 120, spring 125, and shaft 128 are common to both the override means and selector unit, and serve to control or adjust the transmission of forces from the servo-unit 7 to the control member 18.

Referring to FIGS. 1, 3 and the sectional portion of FIG. 8, the selector unit may be attached to any portion of the vehicle in the operator's compartment, and is illustrated as being secured to the conventional steering post 152 by a bracket 154. The bracket includes a plate 156 which is suitably secured, as by spot welding or brazing, to a bushing 158 provided to support a carriage means such as a tube 160 disposed for axial movements in the bushing 158.

Inactivating (and activating) or release means are provided to enable the brake arm 11 to inactivate the "automatic-throttle" or speed regulator operation upon each downward movement of the brake pedal, and also to enable selective automatic re-activation of the speed regulator mechanism at least upon a partial travel of the accelerator; the re-activation is "automatic" in the sense that it can be done without requiring the operator to reset the device manually. Several forms of such inactivating or release means are illustrated herein, both including operating means such as the detent 120, spring 125, and the stop 32b. In one form, the inactivating or release means, in addition to these elements, includes flexible shaft 128 and its sheath 130, plug 134, bracket 136 and also certain elements in the selector unit now to be described.

Referring to FIGS. 1 and 8, a plug 162 is secured to one end of shaft means such as a tube 160 by suitable means, as by upsetting or soldering, and includes a bore for guiding and supporting flexible shaft 128 which extends into tube 160. A sheath 164 is secured to plug 162, as by brazing or upsetting, and is made as long as possible without interfering with bracket 136. Similarly, the end of sheath 130 is set, by its adjustment in clamp 131, to be as close as possible to bracket 136 without interfering with the maximum brake travel. The clamp 131 is set far enough from the floorboard to provide about 2–4 inches of the sheath projecting to the left through an aperture in floorboard 17. This extended sheath portion along with sheath 164 cooperate to provide sufficient flexibility and yet rigidity to enable the exposed portion 128a of shaft 128 to be moved by the arcuate brake arm 11 without adding undue strain or friction. The shaft 128 is secured (FIG. 8) to a spring retainer 166 by suitable means, as by staking the retainer to the shaft or brazing a cap 168 to the wire, or the like. A light spring 170 abuts plug 162 at one end and at its other end urges retainer 166, and shaft 128 against a stop-pin 172 secured to tube 160, as by pressing. The elements described thus far comprise the inactivating means above referred to, to be discussed further in the section herein entitled "Overall Operation."

Manual restraining or lock-out means are provided to enable the vehicle-operator to manually render the "automatic-throttle" action completely inoperative at any time, preferably by positive mechanical means; which thereafter requires manual reset only once to render the apparatus able to achieve automatic engagement by the automatic-activating means described above. Such manual restraining means in FIGS. 1 and 8 are included in the selector unit as follows: A light spring 174 is inserted between stop-pin 172 and another pin 176 pressed through a cam 180 (also see FIG. 9) and through a pair of axial diametrically opposite slots 182 in tube 160. The cam is forced by the initial loading of spring 174 against one or two flat washers 184 which, in turn, abut the end of the fixed bushing 158. Hence, the cam 180 is always held in the position shown by spring 174, but tube 160 may be moved axially to the left while compressing spring 174 as permitted by the slots 182.

A cylindrical latch-ring 186 is secured to tube 160 by a pin 188, as by pressing through the tube to prevent axial movements in relation thereto. A knob 190, having a Braille button 192 on its periphery, includes a cam portion 194 extending therefrom. The knob is retained for axial movements in relation to tube 160 by a pin 196 pressed through the cam portion 194 and through axial diametrically opposite slots 198 in tube 160. A spring 199 is inserted between pins 188 and 196 to hold the knob 190 normally in its left-most position in relation to the tube as permitted by slots 198. A latch or detent 200 is hinged to plate 156, as by a pin 202, and is guided by a stamped depression 203 in plate 156 and urged downwardly (in a counterclockwise direction) against the cam portion 194 for cooperation with latch-ring 186 by a wire spring 204 prevent downwardly (FIG. 8) and suitably connected to plate 156, as by a retainer pin 206. The foregoing elements, therefore, comprise the manual restraining means above referred to.

Automatic restraining means are provided to render the "automatic-throttle" action completely inoperative whenever the operator manually moves an element of the vehicle associated with or incident to normal operation thereof, particularly when inactivating or activating the vehicle. Such means in addition to the elements comprising the manual restraining means, above discussed also include the following, considering for the present only those elements disclosed in FIG. 1 and corresponding elements in FIG. 8. A small solenoid 210 is secured to plate 156 as by screws, and includes an armature 212 having secured thereto a shaft or wire 214 hingably connected to detent 200 to effect movements thereof. The solenoid, in the form illustrated in FIG. 1, is connected in the normal electric circuit in which either the left vehicle door 216 or right door 218 closes one of a pair of spring-biased switches 220 and 222, respectively, to energize the usual dome and courtesy lights 224 by means of the vehicle battery 226. The solenoid coil 228 (FIG. 8) is grounded and may be connected in one form, as shown in FIG. 1, by a single conductor 230 connected between the switches and the light to be unaffected if the light burns out. Hence, whenever either door is opened, the solenoid is energized to raise detent 200. Various arrangements of electric circuits are used by different automobile manufacturers to energize the dome light. I have found that the solenoid can be properly connected in any of these circuits, although two wires are sometimes required to the solenoid when the switches are used to ground the circuit. It is only necessary that the solenoid be energized while a door is open, and preferably in parallel with the dome light so the solenoid operates if the light burns out. The additional elements above discussed, therefore, in cooperation with the latching elements of the manual restraining means, comprise the automatic restraining means above referred to.

Means are included in the selector unit in combination with elements 62, 78 and 80 of the brain unit, for enabling the vehicle-operator to select any desired speed at which the regulating mechanism operates. Referring to FIGS. 1 and 8, such speed-selecting means are illustrated as follows: When knob 190 is rotated manually, the pins 196 and 176 cause the cam 180 to revolve with the knob because the slots 198 and 182, respectively, prevent relative rotary movements of the knob and cam with respect to tube 160. Also, pin 176 has an extension 176a to abut a portion of plate 156 for limiting rotary travel of knob 190 to slightly less than one complete turn. The washers 184 are selected to provide proper friction to maintain any selected rotary position of the knob caused by the force of spring 174 acting on pin 176 and cam 180. When knob 190 is turned clockwise from the position shown, which would correspond to 25–30 m.p.h. for example, a plunger 230 slides axially in a tubular sleeve 232 biased by a spring 234 to follow the cam 180. The sleeve 232 is secured only to plate 156 by suitable means, as by brazing, and is set close to tube 160 but does not restrict its axial movements in any way. The flexible shaft 80 is secured to plunger 230 and slides therewith in its sheath 81 to move retainer 78 for adjusting and establishing the initial force of speeder spring 62. The wire shaft 80 slides through a tight-fitting hole in a synthetic rubber seal 236 suitably secured to cover 61, for sealing the chamber 76. The sheath 81 is inserted in a bushing 238 secured to cover 61, as by brazing or staking, and a screw, or other suitable means, locks sheath 81 in place. Thus, clockwise rotation of knob 190 effects a compression of spring 62 by means of cam 180 to increase the governed speed, and conversely.

The single small tactile indicating button 192, or its equivalent projection or indentation (which might be termed a "Braille" indicator) is secured to the knob, or otherwise made a part thereof to comprise a single tactually sensible portion of the knob. With this construction, the various angular settings of the knob may be felt by the operator at various "clock" positions (such as 3, 6, 9, 12 o'clock) and the corresponding speed observed from the speedometer and memorized. Thereafter, the operator can adjust for any desired speed by revolving the knob by the sense of touch to the memorized "clock" position corresponding to the desired speed. This "Braille" system is preferred to the usual calibrated or other visual dial means for setting speed, from a safety standpoint, since the operator does not have to remove his sight from the road. My novel speed-selecting means enables the desired complete speed range to be spread over the one complete rotation of knob 190 as limited by pin extension 176a, or equivalent. Thus, with my speed-setting system, it is possible to provide any desired speed range (such as 25–90 m.p.h., for example) in the one complete turn of the knob. For this very useful result, it is only necessary to change the characteristics of speeder spring 62 such as the rate and initial loading thereof.

OVERALL OPERATION

The operation of the entire automotive speed control apparatus described thus far will now be described. Additional mechanism and modifications disclosed herein will be discussed separately hereinafter.

"*Automatic-throttle*" *operation.*—In many situations, as previously explained, when driving an automotive vehicle such as for turnpike driving, it is desirable for the vehicle operator to be able to remove his foot, and thereafter the control means is automatically operated by the governor or speed regulating mechanism. The device will first be considered in its inoperative or "off" condition, and then its operation will be considered when the automatic-throttle mechanism is activated.

Referring to FIGS. 1 and 8, FIG. 8 illustrates the selector unit when the "automatic throttle" action is completely inoperative or in its "off" position. For this condition, tube 160 is urged to its most rightward position by spring 174 limited by latch-ring 186 abutting the end of bushing 158. In this position, shaft 128 is forced in its most rightward position such that the other end thereof abuts tab 126 in the override mechanism to force detent 120 and its catch 121 downwardly, as viewed in FIG. 1, to completely clear the stop 32b. With the selector unit in this position, the control means including throttle 16 and its entire connecting linkage (elements 21, 22, 23, 34, 39, 26, 18, 33) may be moved unrestrictedly by the accelerator 20 throughout its normal travel just as though the entire "automatic throttle" speed regulator mechanism and its control system were completely removed from the vehicle. This is true since pin 32 and stop 32b can now slide freely in slot 30, the link 33 being guided by tab 29a, disregarding for the present the "push-back" action to be described.

In order to set the control system in a "ready" position to enable subsequent activation of the speed governor mechanism, knob 192 is first pulled to its most leftward position (the position shown in FIG. 1) from the position shown in FIG. 8. At this time the cam-portion 194 is pulled clear of detent 200 to enable the catch 200a of the detent to engage latch ring 186 when spring 204 moves the detent into the position shown in FIG. 1. The operator can now remove his hand from the knob since the latch 200 will hold the entire tube assembly in this leftward position, so that the compressed spring 174 maintains the latch ring against the catch 200a (as in FIG. 1). Tube 160 in its leftward movement with knob 190 carries with it (by means of springs 170 and 125) the entire flexible shaft 128, so that detent 120 is moved into its operating position by spring 125, as in FIG. 1. At this time, however, the speed regulating mechanism is not yet connected, and the throttle 16 with its link 33 and lever 18 would be held in its idle position by spring 26, while the accelerator and its linkage mechanism are also held in their idle positions by spring 24 (as shown in FIG. 1). Hence, under these conditions, the stop 32b would be positioned somewhat to the left of catch 121, even if the engine is off when the knob is pulled and no vacuum exists in chamber 44. When the engine is started or if the knob were pulled after starting, sufficient vacuum is transmitted to chamber 44 (since pilot valve 48 is closed) to pull diaphragm 40, tube 59 and base member 29 with its detent 120 to the extreme right position; at the same time the link 33 and its pin 32 remain in their idle positions with throttle 16, so that the stop-pin 32b then stands at its extreme relative travel to the left in relation to slot 30, since the accelerator has not yet been advanced from its idle position.

As the vehicle-operator depresses the accelerator pedal 20 and the vehicle begins to accelerate, the stop member 32b is gradually moved to the right by the accelerator linkage since pin 38 now abuts the lower end of slot 36. Consider the action first if the operator accelerates the vehicle *slowly* until the vehicle attains a speed, preselected by rotating knob 190, as above described. When the vehicle attains the preselected speed, such as 65 m.p.h. for example, pilot-valve 48 starts to open to reduce the vacuum in chamber 44 so that spring 46 starts the base member 29 and its detent moving leftwardly, as viewed in FIG. 1. When the detent 120 passes by the stop 32b, it lower slightly until two events occur: Firstly the clicker spring 123 bends to the right, and when the catch 121 is to the left of stop 32b the detent 120 is moved by spring 125 into the engaged position as shown in FIG. 1. Secondly and simultaneously, the clicker spring snaps off the stop 32b with an audible signal sufficiently loud to be heard by the operator, even though the override unit is located in the engine compartment. In this manner the vehicle-operator is made aware that the "automatic throttle" action is now in operation. The operator now removes his foot from the accelerator, and the stop 32b is urged in a retarding direction by spring 26 into abutting contact with detent 120 at its catch 121. The elements of the entire apparaus are now in the position shown in FIG. 1, and the control means is operated by the speed-governor mechanism to maintain vehicle speed in a manner previously described, just as though the tube 59 were connected to and a part of the throttle 16 and its connecting linkage.

In the form of control system shown in FIG. 1, a "double-abutment" or "double-override" linkage mechanism is provided. With this system, constructed as described above, when the governor override unit 28 is engaged, as in FIG. 1, the accelerator override 34 enables the accelerator and its entire linkage (elements 21, 22, 23, 36) to be biased by spring 24 to stand in their idle position. Since the friction and inertia of the accelerator and its linkage does not have to be overpowered by the speed governor mechanism, the size of servomotor 7 can be substantially reduced. A smaller servo-motor will respond faster, since for example, in the form shown in FIG. 1, less air must be displaced. Any servo-motor, regardless of the type of energy used therein, can be made to respond faster by reducing its size providing the required forces are reduced. With a faster response, a speed governor mechanism is more stable without "hunting."

The novel double-override mechanism can be optionally or additionally utilized to provide another useful result, particularly when manifold vacuum is used as a source of energy for the servo-motor. If the size of the servo-motor is not reduced, the diaphragm vacuum in chamber 44, required to balance and operate spring 46 can be reduced. With this arrangement, the speed regulator mechanism will maintain the governed speed at higher power (lower manifold vacuums), than if the lost motion mechanism 34 is omitted. I have found that small "Teflon" bushings mounted in the carburetor to support the throttle shaft to reduce the rotary friction thereof, further enhances this "double abutment" control system.

If a customer does not want to add the override unit 34, one of springs 24 or 26 may be omitted and link 39 would be connected to bellcrank 22, and the servo-motor must then operate the entire accelerator linkage. However, either a larger servo-motor must be used, or particularly when manifold vacuum is used as a source of energy, the spring 46 is made heavier to operate at a higher diaphragm vacuum; this vacuum might be 7–8 inches of mercury, so that the governed speed could not be maintained at manifold vacuums less than this valve (at higher powers).

The "automatic throttle" operation may also be activated while the vehicle is being driven with the knob 190 initially in the "off" position. In this event, if the vehicle speed is higher than the pre-set governor speed and the knob is pulled out all the way to the left as viewed in FIG. 1, then the detent 120 will stand on the left side of the stop 32b. The vehicle-operator then can remove his foot from the accelerator pedal 20 and the governor mechanism will automatically maintain the pre-set speed as above described, since the stop is moved into abutting contact with catch 121 of the detent member. If the operating vehicle speed is less than the pre-set speed when the knob 190 is pulled leftward into the automatic throttle position, the detent member will stand on the right side of the stop 32b, as viewed in FIG. 1. The vehicle operator then must depress the accelerator until the stop moves to the right past the detent 120 until it swings clear of the stop pin extension to provide automatic engagement. Then the driver can remove his foot and the detent 120 carries the throttle and its linkage in speed governing movements, all as above described.

When the brake pedal 10 is depressed to reduce the speed of the vehicle, the release bracket 136 compresses spring 170 and mechanically moves plug 134 and shaft 128, as above described, to positively force detent 120 clear of stop 32b. Instantly, spring 26 pulls the throttle and link 33 with stop 32b into their idle positions, and the high vacuum in chamber 44 (valve 48 is now closed) pulls the base member to the right. When the clicker spring 123 passes by stop 32b in a reverse direction, it again provides a clicking sound now to indicate that the "automatic throttle" is inactive. After the brake pedal is released, the automatic activating means, above discussed, performs its desired function; the spring 170 returns shaft 128 into the position shown in FIG. 1 for enabling detent 120 to return automatically to its operating position. In order to again activate the governor, the operator merely depresses the accelerator (still assuming a slow acceleration) and the "automatic throttle" action is again activated when stop pin 32b passes by the catch 121 indicated audibly by clicker 123, all as previously described.

When the vehicle-operator again depresses the brake pedal, the "automatic throttle" operation is inactivated as above described. If now, the operator shuts down and leaves the vehicle by either door, such as door 216, the automatic restraining means is activated as previously described. This action temporarily energizes solenoid 210 to raise detent 200 which enables spring 174 to move tube 160 into the position shown in FIG. 8. In this action the spring 174 forces shaft 128 (by means of pin 172 and cap 168) to the right by overpowering spring 125 to move and hold detent 120 completely clear of the normal path of travel of stop 32b. Hence, the "automatic throttle" is now inoperative and cannot be engaged until and unless the vehicle operator deliberately pulls knob 190 into the latched position shown in FIG. 1. And even then, the second deliberate step of depressing the accelerator is required until detent 120 can engage stop 32b.

After the "automatic-throttle" is again activated, the vehicle operator can, at any time manually render the automatic throttle action completely inoperative by using the manual restraining means, as above discussed. In this event, the operator pushes knob 190 to the right so that cam-portion 194 forces catch 200a clear of latch-ring 186. Spring 174 is preferably made strong enough only to move shaft 128 and overpower the light spring 125 for urging detent 120 into its inactive position, only after the brake pedal has been depressed. When the "automatic throttle" action is operative, spring 174 preferably is not strong enough to overpower the friction of catch 121 abutting stop 32b. But the vehicle operator can press knob 190 further until the pin 196 abuts the right end of slot 198 to physically and mechanically force shaft 128 (by means of pin 172 and cap 168) to release detent 120. For this result it is only necessary that the catch 200a releases before pin 196 reaches the right end of slot 198. The reason the lowest possible force is preferred for spring 174 is to reduce the friction force of latch-ring 186 against the catch 200a so that the solenoid 210 can be as small as possible, thereby lowering its cost.

In accordance with the foregoing discussion, when the term "inactive" is used herein, it refers to the released condition of the automatic throttle operation, which can be reactivated merely by depressing the accelerator without manually pulling knob 190. When the term "inoperative" is used herein, it refers to the condition when the restraining means (either manual or automatic) has raised detent 200 so that the operator must again pull knob 190 to initiate operation of the device.

*Automatic acceleration.*—Automatic throttle devices now in use are so arranged that the vehicle must actually attain the set speed before the regulating mechanism can be engaged. These present speed devices if equipped with electric-powered servo-motors, or the like, would accelerate the vehicle much too rapidly if means were provided to enable engagement *before* the vehicle attains the set speed. Under these conditions, the "roar" of the engine accompanying such fast acceleration can dangerously startle the operator. It is highly desirable for the speed-regulating device to provide sufficiently slow acceleration that it can be safely engaged or activated at any speed below the set speed; and then have the vehicle automatically accelerate slowly or moderately from the engaged speed to the set speed. It is particularly desirable to effect such automatic engagement only after a partial advance of the throttle or accelerator so that the speed governor device cannot be engaged when the engine is idling. Then after the vehicle attains a speed somewhat less than the preselected speed or the throttle is deliberately opened partially by the vehicle operator, the speed regulator device engages and automatically accelerates the vehilce moderately to the set speed. This "automatic acceleration" action is more desirable than the action of present control systems because (1) the operator does not have to wait until the set speed is attained each of the many times the device must be engaged in normal driving, and (2) the vehicle-operator can remove his foot from the accelerator and the vehicle will automatically seek out and stop accelerating at exactly the preselected speed in each of the many times the speed-governor action must be inactivated and re-activated in normal driving, and (3) by using the "Braille" button 192, the vehicle-operator never has to look at the speedometer once he has learned the "clock" positions of the knob 190, thereby increasing the safety of present driving procedures. My hand-throttle devices (such as S.N. 118,411) inherently produce such slow acceleration after automatic engagement. But governor or similar "closed-up" speed control devices having electric servo-motors or other constant power energy sources tend to accelerate the vehicle too rapidly. In actual practice I have found that these advantages greatly expand the use of such speed control apparatus to include city and particularly suburban driving (on main fast streets and boulevards) between the "rush hours" of traffic, as well as for highway and turnpike driving, to be discussed further.

Several forms of means providing such desirable "automatic-acceleration" are illustrated in the present invention. In one form, a characteristic of manifold vacuum, as discussed previously, is utilized to enable slow automatic-acceleration following automatic activation or engagement at a speed substantially less than the governed speed. In all carbureted engines, the manifold vacuum reduces from about 19 inches of mercury at no-load to about 1–2 inches of mercury at full-load as the throttle is opened. FIG. 4 shows a power curve A-C-M representing wide-open-throttle horsepower vs. r.p.m. or m.p.h., and also a "road-load" curve of engine power A-D-S. An isochronous governor power curve C-D-E is also illustrated, together with various governor operations to be discussed. Such automatic acceleration is accomplished by the device shown in FIG. 1, according to the present invention, by selecting the spring 46 so that the diaphragm vacuum in chamber 44 is never more than a preselected value, such as 7 or 8 inches of mercury for example, which is a minimum for the manifold vacuum in this instance. The throttle opening at the minimum manifold vacuum corresponding to this maximum diaphragm vacuum restricts the acceleration rate sufficiently to enable safe automatic acceleration. If the spring 46 is selected to provide a working diaphragm vacuum of 8–9 inches of mercury (or higher), the acceleration rate is even slower after automatic-activation. However, this desirable result is accomplished at the expense of reducing further the engine power at which the governed speed can be maintained. In FIG. 4 the first accleration curve as above referred to, might be represented by A-P-F and the second example might be represented by curve A-R-T.

The automatic-activation or engagement discussed previously in explaining the operation of the control system in FIG. 1, was presented on a basis of a deliberately slow acceleration by the vehicle-operator, wherein the automatic engagement is effected when the governed speed is actually attained. As explained above, in order to provide automatic acceleration, it is desirable to effect activation of the speed regulating action after a partial and smoothly rapid depression of the accelerator but substantially before attaining the preselected speed. For this purpose, the same characteristic of manifold vacuum (which reduces as throttle 16 openings) is utilized to effect this early automatic engagement of detent 120 and pin 32b, as follows: Assume for this example that the (maximum) operating *diaphragm* vacuum is set for 8 inches of mercury, as determined by the force of spring 46, and that the engine is idling with the vehicle ready to be accelerated, and that the regulator device is set to govern at 65 m.p.h. Firstly, the accelerator is depressed until the vehicle speed is 20–30 m.p.h., as desired, and then the accelerator is depressed smoothly but rapidly further until the operator hears a "click" signal; he can then remove his foot from the accelerator and the vehicle will be automatically accelerated at a moderate rate (corresponding to 8 inches of mercury) up to the governed speed which is thereafter maintained. This action is produced, according to the present invention, in the following manner. The accelerator temporarily was rapidly advanced enough to lower the manifold vacuum (which is also the vacuum in chamber 44) sufficiently less than 8 inches of mercury and long enough to enable spring 46 to move detent 120 past the stop 32b, as indicated audibly by clicker 123. After the driver removes his foot from the accelerator, the automatic acceleration then proceeds at a manifold vacuum of 8 inches of mercury; because if the throttle opening increases, the manifold vacuum will drop which lets spring 46 retard the throttle until the manifold vacuum is substantially restored. Thus, in the present concept the particular governor construction (wherein the servo-motor advances the control means when the vacuum increases and a spring retards the control means) provides a pressure-regulator action to restrict or limit the rate of automatic acceleration.

Thus the speed regulator action is activated when the throttle is temporarily advanced enough to lower the vacuum to 8 inches of mercury or less, in the assumed example above, to enable automatic engagement. I have found in tests that, while this higher vacuum is necessary for limiting or restricting the acceleration rate, the automatic acceleration feature operates better if the throttle must open to drop the manifold vacuum to about 3–4 inches of mercury to effect automatic engagement and subsequent automatic acceleration. With spring 46 set to provide this lower manifold vacuum, a higher engine power can be obtained under governor operation. In my said application, Serial No. 74,315, positive mechanical means operated by the accelerator is disclosed for effecting engagement after a partial travel of the accelerator. The action of detent 120 in relation to stop 32, as discussed previously, enables the activation or engagement to be "automatic" in the sense that it occurs incident to a normal advancement of the accelerator pedal without manual reset of the device except for the "selective" action by the vehicle-driver; and after such selective activation, the vehicle automatically accelerates up to the preset speed. The activation is "selective" in the sense that the automatic activation is caused to occur by a temporary reduction of manifold vacuum caused by a corresponding deliberate and temporary advancement of the throttle by the driver entirely at his discretion as discussed above.

It is therefore very useful to provide moderate automatic acceleration but enable automatic engagement at a throttle opening providing a manifold vacuum of 3–4 inches of mercury, and to enable "automatic throttle" operation at this lower vacuum (almost full load). Another form of acceleration retarder or restricing means is provided in the present invention to enable automatic acceleration under these desirable conditions. As illustrated in FIG. 1, such acceleration restricting means comprises a weight 250 suspended preferably by a leaf spring 252 acting as a hinge and connected to a support 254 to provide angular swinging movements of the weight. A valve 256 is connected to weight 250 for operation thereby and normally closes a passage or tube 258 communicating with chamber 44 through a nipple or tube 260 in cover 67. A valve, such as ball valve 262, is supported by a post or shaft 264 suitably secured to diaphragm 40 for movements therewith. Weight 250 might be supported vertically, but is illustrated at a slight angle, such as 5 degrees, so that the weight itself normally maintains valve 256 closed, even when the vehicle is on a steep upgrade of 6–8%. A very light spring 266 may be provided if necessary to act on valve 252 in either direction as required. Manifold vacuum normally tends to hold the valve closed except during acceleration when the vacuum is low. With the weight suspended at a slight angle, as shown, spring 266 probably can be omitted.

The operation of the acceleration retarder is as follows: When the vacuum in chamber 44 is high (as at idle) the diaphragm 40 is in its extreme rightward position which closes valve 262 (shown dotted), also abutting a post 268 for balance. When the accelerator is temporarily advanced to reduce the vacuum below 3–4 inches of mercury to effect automatic engagement, diaphragm 40 moves to the left as above discussed. This movement is made faster by valve 256 which bleeds air into chamber 44 so that automatic engagement of catch 121 and stop 32b is effected. The vehicle operator is notified of the engagement by the clicker 123 and/or the "push-back" force, so that he removes his foot from the accelerator, and the vehicle starts to automatically accelerate, as above described. But now, such acceleration causes valve 256 to be opened by weight 250 to reduce the vacuum on diaphragm 40. This, in turn retards throttle 16 to restrict the acceleration, which then tends to close valve 250. In practice the weight maintains valve 256 in a position to balance the effects of a definite (reduced) rate of acceleration, wherein the manifold vacuum might be 9–10 inches of mercury. However, after the preselected speed is attained the acceleration stops, so that valve 256 closes and the preset speed is automatically maintained by the speed-regulator mechanism, even at higher powers such as at 3–4 inches of mercury, as desired.

Thus the automatic acceleration-retarder-means becomes effective substantially upon engagement of the governor mechanism (as when diaphragm 40 moves detent 120 into engagement with stop 32b); and it becomes ineffective when the vehicle actually attains the preselected speed after automatic acceleration. Valve 262 and shaft 264 could be omitted, and the diaphragm itself might be used as a valve to close off the left end of nipple 260. Hence with the foregoing two means for providing automatic engagement, the speed regulator device is automaticaly activated either upon attaining vehicle speed or by temporarily advancing the control means whichever event occurs first, the latter providing the automatic acceleration.

One of the long range aspects in the utility of this automatic acceleration concept is to enable extensive use of these devices in city and particularly suburban driving, as well as on turnpikes. As discussed previously, with the population trend to suburbs in most urban areas, fast streets or main roads are being provided with long stretches between traffic lights to move traffic rapidly. I have found the automatic acceleration feature to be highly useful in this type of driving between the "rush-hours" of traffic, particularly with the automatic engagement concept disclosed herein; this is true because the total time of using the "automatic throttle" operation can be increased by 30%–40% in such city-suburban driving, compared to waiting until the speed is attained before removing the foot from the accelerator.

*"Push-back" operation.*—Now consider the vehicle operating with the control system providing added accelerator-resistance or "push-back" force, if desired, to warn the driver that a preselected speed has been attained or exceeded.

First consider the push-back action when the speed governor mechanism is engaged and the control system is all as shown in FIG. 1, and operating as described previously. The vehicle-operator can override the governor mechanism by merely depressing on the accelerator 20 until link 23 abuts pin 38 upwardly to move link 39 and bellcrank 18 for advancing throttle 16 any desired amount. At this time, the link 33 moves stop 32b in a rightward direction a very short distance to abut stem 140 and close valve 138. This action *instantly* drops the vacuum in chamber 44 to zero (valve 48 is now partly open), and the full force of servo-spring 46 acts through tube 59, valve 138 and stem 140 to bear on pin 32b, which added force is transmitted through the accelerator linkage to the accelerator. Thus, when the vehicle operator overrides the automatic throttle action of the governor, he feels the sharp or sudden additional "push-back" force of spring 46. This force can be overpowered by the operator to advance the throttle any desired amount. When his foot is removed from the accelerator, pin 32b returns to abut catch 121 and the vehicle continues under automatic throttle operation at the preset speed. The advantage of shut-off valve 138 is that all vacuum is removed from chamber 46. I have found that the push-back action will operate without valve 138, but some vacuum (although low) always exists in chamber 44, so that the action with valve 138 is extremely sharp and sudden.

Now consider the "push-back" force when the "automatic throttle" action is inoperative with the knob 190 and the rest of the control system in the position shown in FIG. 8 or "off" position. Although the vehicle operation is now normal, the "push-back" system is still operative in the form of my invention shown in FIG. 1. When the vehicle operator depresses the accelerator and the vehicle accelerates to increase its speed, stop 32b is gradually carried by the accelerator linkage to the right, as viewed in FIG. 1. When the vehicle attains the preset speed, such as 65 m.p.h. in this example, the vacuum developed by the signal unit 3 and acting on diaphragm 74 opens pilot valve 48 to gradually reduce the vacuum in chamber 44 (but in a very small change of speed) so that spring 46 moves override unit 28 leftwardly until pin 32b abuts valve stem 140. The full force of spring 46 suddenly is applied to the accelerator through its linkage in a throttle-retarding direction in the same manner as described previously so that the operator "feels" this sudden added force on the bottom of his foot to warn him that the vehicle has attained the preset speed. He then merely holds his foot "against" this added force as he drives the vehicle regardless of its attitude, and the set speed will not be exceeded. As the vehicle ascends a hill, the action of the governor mechanism as previously described will cause the stop detent 32b to abut the stem 140 at a wider throttle opening; and for descending a hill, the abutment occurs at a lower throttle opening. For passing or otherwise exceeding the set speed in emergencies, the operator can press hard on the accelerator pedal to overpower spring 46 as described above to obtain any desired opening of throttle 16 up to wide-open position. When the operator removes his foot from the accelerator, as when applying the brakes, the accelerator and throttle instantly return to their idle positions and as the vehicle speed reduces below 65 m.p.h., the governor again applies vacuum in chamber 44 to move the override unit 28 to its extreme rightward position. Any desired vehicle speed at which the "push-back" force of spring 46 occurs may be selected by the driver by rotating knob 190 for adjusting spring 62. In the form shown in FIG. 1, the "push-back" action can be rendered inoperative in normal driving only by revolving the knob clockwise to its full stop position at the highest possible speed, such as 90 m.p.h. for example.

For best results, the valve 138 includes a controlled leakage orifice to transmit static manifold vacuum to chamber 44 when the pilot valve 48 again closes with a slight reduction of speed caused by the push-back force. Such controlled leakage can be provided, for example, by a notch in valve 138 which in effect comprises a small bleed orifice when the valve is closed. By selection of the notch size, the push-back force can be made to pulsate slowly when the vehicle operates at the pre-selected speed. This slight pulsation accentuates the push-back force and enables the use of a smaller servo-motor spring 46, which is particularly helpful if the two lost-motion units (28 and 34) are provided to produce a fast governing action.

In operation, in order for diaphragm 40 to overpower the force of spring 46, a slight amount of vacuum is transmitted through valve 138 which is accomplished by means of the notch-bleed. At this time, vacuum temporarily and slowly builds up in chamber 44 to cause the driver's foot to open the throttle very slightly; this action in turn causes the vehicle speed to increase very slightly, such as one m.p.h. This slight increase in speed again opens valve 48 enough to remove the vacuum in chamber 44, which again applies the full force of the spring 46 to react against the driver's foot, and the cycle is repeated. In this manner, when the driver holds the accelerator at a point where he just feels the resistance force, the pilot valve 48 is positioned just at the condition where a change of only about one m.p.h. or less will cause it to "crack"-open. The result is that the driver will feel an intermittent and slightly-varying resistance force in the form of a slight pulsation whenever he maintains the accelerator in positions providing the desired preset speed.

One useful result of this construction and operation is that the driver knows at every instant the speed condition without removing his eyes from the road. If he operates the vehicle at a speed less than the preset speed, he will feel *no resistance force*. Whenever he operates the vehicle *at* the preset speed, he would feel a *pulsating resistance force*; and whenever the driver operates the vehicle at a speed higher than the preset speed, he will feel a *"solid" resistance force*. In this manner, the driver can ascertain his speed-condition at all times.

My invention can provide a novel use of the "push-back" force as a warning of excessive acceleration rate by the driver, as well as for speed warning. If the vehicle is accelerated at or near the wide-open throttle when the manifold vacuum is less than the assumed four inches of mercury, insufficient vacuum exists in chamber 44 (valve 138 now closed) to overpower spring 46 at all speeds below the preset speed. Thus the "push-back" action will occur at all speeds below the set speed for very fast acceleration to act as a deterrent for "hot-rod" driving in the city. But if the acceleration is normal as is usually done at part-throttle operation, corresponding to manifold vacuums of four to eight inches of mercury, for example, the "push-back" force does not occur until the pre-selected speed is attained. This acceleration warning feature may enhance the utility of the push-back concept to justify its continued use.

After much testing of these devices with my automatic acceleration feature, it appears that such automatic operation, as above described, may enable the automatic-throttle (governor) operation to accomplish everything the "push-back" currently provides. The main argument for the "push-back" action is to prevent speeding; and excessive speed can only occur when the driver is not limited by traffic. But in this same condition (as between "rush-hours") with my automatic activation and acceleration control system as disclosed above, the speed-regulating action automatically maintains the safe selected speed, and does so without the need of holding the accelerator against the resistance force. However, an improvement will be discussed in relation to FIG. 5 that may additionally enhance the utility of the accelerator-resistance action, thereby to further justify its use. But, regardless of the present diverse opinions regarding the "push-back" action, if the public desires this feature, my speed control apparatus can be adapted to provide various improved "push-back" actions by novel means, as described above and hereinafter.

As previously mentioned, although any governor mechanism may be used, a desirable feature of the speed governor illustrated herein, in which the spring tends to retard the throttle and the working fluid tends to advance the throttle, is that if the synthetic rubber hoses or tubes 56 and 60 connecting the governor components should break or leak, the spring 46 will close the throttle. Also, if the "push-back" feature is not provided, the spring 46 may be omitted if the accelerated spring 26 is strong enough to provide satisfactory governing; this is particularly useful with the double-override system as previously explained.

Having thus described the operation of the control system of the present invention, the inventive concept is unchanged by various modifications or reversals of the elements. For example, it would make no difference in the operation of the apparatus, particularly without the "push-back" means, if the override unit 28 were operatively connected to link 33 and the stop pin 32 were operatively connected to tube 59. The inventive concept also would be unchanged by any other such reversals of the override units 28 and the servo-motor 7 in relation to the accelerator-throttle linkage mechanism, providing the above-described operations are producible. Also, the flexible shaft 128 and its sheath 130 may be secured and mounted to the override unit 28 at any desired angle merely by providing proper angular projections to detent 120. In addition, the clicker 123 could be secured to any portion of the base mmeber 29 providing a suitable pin (equivalent to stop 32b in its action) is secured to link 33 to release the clicker spring when pin 32b engages catch 121, or reversely; also, the speeder spring 62 may be a coil or spiral spring acting directly on pilot valve 48 or its shaft, as in chamber 52. None of these or other such reversals would change the spirit of my invention.

When the terminology in the claims recite the principles disclosed herein in terms of engine speed, it should be understood that for such speed control apparatus, vehicle speed and engine speed are to be interpreted synonymously in construing the invention defined by these claims. The speed governor mechanism can be made to operate with any working fluid in the servo-mechanism such as positive air pressure from the air-brake pump of trucks or busses and passenger cars; or compressor outlet or other pressure of gas turbines; or diesel fuel or engine oil of diesel engines; or oil pressure or cooling water pressure, or power steering liquid pressure in trucks and passenger cars, etc.

ADDITIONAL FEATURES AND MODIFICATIONS

Other important features or sub-combinations of my invention are illustrated in FIGS. 1, 5, 6, 7 and 8 and will now be described.

*Electric brake release.*—In FIG. 1, an optional electric release means operated by the brake pedal 10 is illustrated, and which may be used to provide a second auxiliary release means (for safety purposes) in addition to the fully mechanical release means above described. Also, if the mechanical release cannot be installed in any given vehicle for any reason such as limited space, the electric release might be used in place of the mechanical release, although the latter is preferable.

Referring to FIG. 1, the second or alternate release comprises a solenoid 270 having its armature 272 operatively connected to detent 120 and biased upwardly by spring 125. When the brake pedal is depressed, it closes the usual brake-operated switch 274 to energize rear lights 276. Solenoid 270 is also energized to pull armature 272, and detent 120 clear of stop 32b. When the foot is removed from the brake pedal, solenoid 270 is deenergized so that spring 125 pulls detent 120 back into position for automatic engagement. The driver must only depress the accelerator, without pulling knob 190, to effect such automatic engagement, as previously described. As previously stated, this electric release means providing automatic engagement was disclosed in my said application, S.N. 712,847, in FIGS. 3 and 19, but not claimed; it will be claimed in the instant case.

*Curve compensation.*—I have observed in my own driving of such speed control apparatus (and confirmed by others) that when driving on curves, there is a tendency to continue at the preset cruising speed even if the rate should be reduced 5–10 m.p.h. for safety purposes. Compensation means are disclosed herein to sense the highway curvature and automatically reduce the speed temporarily as required on such highway curves. FIG. 5 is a partial section of the brain unit of FIG. 1 including such curve-compensation means. In FIG. 5, a pair of diametrically opposite weights 280 and 282 are hinged for radial movements at pins 284 and 286, and carried by bellcranks 288 and 290, respectively. The other ends of bellcranks 288 and 290 are connected to leaf spring 50 (or to other means connected to pilot valve 48) by means of a pair of light reset springs 292 and 294, respectively.

The operation (during "automatic throttle" governing action) of the curve-compensation device described thus far is as follows: On straight roads, both weights are held against housing 53 by their respective springs. In a left curve, centrifugal force urges both weights to the right (downwardly in FIG. 5). Weight 282 then abuts housing 53, but weight 280 moves radially inward (down) to extend spring 292 and increase the opening of pilot valve 48; this action reduces vacuum on diaphragm 40, and retards throttle 16 by an amount depending on the radius of highway curvature to reduce the vehicle-speed below the preset cruising speed. A greater road curvature effects a larger temporary speed reduction. As the highway straightens out, the weight 282 gradually returns to the position shown in FIG. 5 to gradually restore the preset governed speed. When the highway curves to the right, the reverse action occurs; weight 280 abuts housing 53, and weight 282 is thrown to the left (upwardly) to extend spring 294 and temporarily reduce the speed, as above described.

If desired, additional weights 296 and 298 can be secured to the bellcranks 288 and 290, respectively, to affect the acceleration. During automatic acceleration, as previously described, both weights would move to the left (aided by weights 280 and 282 when moved inwardly) to extend spring 292 and 294. This action opens valve 48 to affect the opening of throttle 16, and hence will affect the acceleration. Weights 296 and 298 may be omitted from the bellcranks 288 and 290, respectively, and the compensating device is then responsive solely to road curvature, which is a most useful application. However, if desired, weights 280 and 282 might be omitted, and then the compensating device would respond primarily to acceleration, as above described.

The curve compensation means shown in FIG. 5, also is believed to be useful in operation of a vehicle when holding the accelerator against the "push-back" force, with the "automatic-throttle" action inoperative. The push-back force in one sense may be considered as a "footrest" that changes position and enables the driver to hold his foot "against" this force, but always stay at constant speed. The mechanism and operation to accomplish this action has been described previously. During such "push-back" operation, when a curve is encountered in either direction, one of weights 280 or 282 extends its respective spring, 292 or 294. This action opens valve 48 more, which automatically causes diaphragm 40 and the accelerator to push back further on the operator's foot causing him to reduce speed by an amount proportional to the radius of highway curvature. When the highway gradually straightens out, the "push-back" speed gradually returns to the preset value. This "curve compensation" feature may extend the usefulness of accelerator-resistance means to justify its continued existence. If desired, the springs 292 and 294 may be omitted and bellcranks 288 and 290 would act directly on a plate 299, shown dotted, that would be secured to the pilot valve or its stem.

The curve-compensation means, whether used with "automatic-throttle" operation or "push-back" operation, provides another safety factor in addition to the actual automatic reduction of speed on curves. This second safety factor is that the periodic and automatic change in speed tends to reduce the possibility of so-called, "highway-hypnosis." Of course, this curve-compensation principle can be applied to any self-propelled vehicle operating on any roadway, such as a train operating on its track. Accordingly, the term "automotive" as used herein is to be interpreted to include any such self-propelled vehicle.

*Modification of FIG. 6.*—All present devices use the "push-back" force only as a speed-warning means. The modified form of my invention illustrated in FIG. 6 provides means to use push-back only to indicate that the "automatic throttle" action is operating. This is illustrated in FIG. 6 which is a modification of FIG. 1, in which a second push-back detent 300 having a catch 301 is carried by stem 140 at a hinge 302 for angular movements thereabout. The detent 300 carries a pin 304 slidable in a slot 306 in detent 126 (or conversely) and a guide or cam surface 308 is disposed at an angle as shown. In the operating position shown in FIGS. 1 and 6, the stop 32b is held by detent 120 for automatic throttle operation. If the operator depresses the accelerator to exceed the governed speed, the stop 32b abuts the catch 301 of detent 300 and closes valve 138 to produce the "push-back" force as above described. When the brake pedal is depressed or knob 190 is manually pushed to "off" position, the detent 120 and now also detent 300 are moved downwardly completely clear of stop 32b, enabled by slot 306. For this action, the slot 30 is doubled in length to provide an extended section 30a, which now enables stop 32b to move unrestrictedly at all times just as though the speed control apparatus were removed from the vehicle. Hence, at this time the "push-back" force cannot be produced, but is only available during "automatic-throttle" operation. Thus, the accelerator-resistance force, in the form shown in FIG. 6, is used as an indicator that the "automatic-throttle" operation is active either upon attaining the set speed or particularly when the governed speed is exceeded, as in city driving, and the operator might otherwise forget whether it has been activated.

In addition, the detent 300 may include shut-off means to close valve 138 for stopping all air bleed when knob 190 is in its "off" position and the device is inoperative. As illustrated in FIG. 6, such shut-off means includes a strong leaf spring 310 suitably secured to detent 308 and carried thereby, as shown to operate as a bellcrank. Spring 310 has an end portion which slides against an abutment 312 extending from base member 29, and the force of spring 310 can always overpower the light spring 142. When shaft 128 forces detents 120 and 300 clear of stop 32b, the resistance of leaf spring 310 forces valve 138 closed in its bellcrank action; and any further movement of shaft 128 merely bends spring 310. If it is desired to eliminate completely all push-back action, but retain the valve 138 only as an air-bleed shut-off, it is only necessary to remove the catch portion 301 of detent 300 (similar to element 316 in FIG. 7 to be discussed), and as shown by the dotted line 308a. Then stop 32b can slide unrestrictedly in slot portion 30a, even when detent 120 is in the position shown providing automatic throttle operation. With this revision, detent 300 with spring 310 in its bellcrank action closes valve 138 when knob 190 is moved into its "off" position.

*Modification of FIG. 7.*—Means are provided in the form of my invention shown in FIG. 7 to replace the push-back action of FIG. 6 and indicate audibly that the "automatic-throttle" is operating when the driver increases the vehicle speed above the governed valve. In FIG. 7, such means comprise a plurality of "clicker" leaf springs 314 (such as three) carried by a lever 316 hinged by a pin 318. The lever 316 includes the slot 306 to enable sliding engagement of the pin 304 secured now to detent 120 (shown reversed from FIG. 16). In the operating position as shown in FIG. 7, when the accelerator is depressed, the stop 32b moves in the slot portion 30a when the speed exceeds the governed valve, and contacts one or more of the clickers 314 from either direction. When stop 32b passes a clicker in either direction, the snap of the leaf spring produces an audible signal (as for clicker 123), so that the driver is alwyas made aware that the "automatic throttle" is active. The shut-off valve 138 and its stem 140 with spring 310 is shown omitted from FIG. 7, but may be used if desired.

*Modifications of FIGS. 8 and 10.*—The senses of touch and/or sound are used for all actions in all my speed control devices from a safety standpoint; the sense of sight is believed undesirable as it invites the operator to remove his sight from the road. This feature combined with my positive mechanical release, and reduced speed on curves and retarded rate of automatic acceleration, and automatic engagement after the accelerator is partially depressed, and automatic restraining means provides an extremely safe but highly useful speed control apparatus.

FIGS. 8 and 10 show additional forms of restraining means which may be used to provide even more safety if deemed necessary. In FIG. 8, the door operated electric circuit is modified from that shown in FIG. 1 to include the engine starter coil switch 320 (normally open) in series with the ignition switch 322. The starter coil switch 320 is usually operated momentarily by the actuator for the ignition switch. Suitable rectifiers 324 and 326 (such as silicon diode) are included to provide uni-directional current in their respective branches of the circuit. With the circuit described, when either the door is opened or the starter coil 328 is energized by closing switches 322 and 320, the solenoid 210 is energized to raise detent 200. For example, assume that a driver has been using the speed regulating device and stops the car and engine but does not leave the vehicle. When he starts the engine, detent 200 is raised to release latch ring 186 and the device is in its "off" position. The rectifiers are provided to prevent the light 224 from energizing when starter switch 320 is closed, and to prevent the starter coil 328 from being energized when a door is opened.

Also in FIG. 8, a flexible shaft 329 in a sheath 330 may optionally be provided, in which shaft 329 is operatively connected to the "drive" button (not shown) of a push-button transmission (Chrysler). When the "drive" button is pushed, shaft 329 moves detent 200 in a lost motion connection 331 enabling it to operate. When the "drive" button is off, shaft 329 raises detent 200 out of operation.

Another form of restraining means illustrated in FIGS. 2 and 10 comprises a quadrant 332 abutting an extension arm 200b of detent 200 (shown as a dotted connection;) the quadrant is secured to the shaft 334 for selecting the transmission positions operable by the manual lever 336. When the transmission is in any position other than "drive" position as shown in FIGS. 8 and 10, detent 200 is raised and maintained clear of latch ring 186. When the lever moves into only the "drive" (or high gear) position, the depression 338 (FIG. 8) enables detent 200 to be revolved counterclockwise by spring 204 when knob 190 is pulled out.

In the form of restraining means illustrated in FIGS. 8 and 10 the quadrant 332 may be made of non-conducting material. A plurality of electrical conductors 340 are embedded in the quadrant in angularly spaced positions between the positions corresponding to the normal settings of lever 336. A sliding contact arm 342 is disposed to alternately contact all of the three conductors 340 (one at a time) to complete a circuit from terminal 344 to 346 through the conductors 340 in parallel. The circuit is also shown in FIG. 8 with arm 342 represented by a switch. In operation, when the transmission lever 336 is moved from any position to another (as from "drive" to "neutral") switch 342 closes for an instant as the arm of switch 342 sweeps across a conductor 340. This brief connection is sufficient to energize solenoid 210 and release detent 200. If this electrically operated release is used, the mechanical release 200b may be omitted if desired.

It is not essential that all the restraining means illustrated in FIG. 8 be used. Any one actually would be safe enough, but two sensors would enhance safety the preferably should include the door switch. For example, the door and starter switch may be used, or the door and the transmission switches; or the transmission switch and the starter switch; or all three may be used as in the circuit of FIG. 8. If either the flexible shaft 329 or transmission quadrant 332 with the extension 200b are used (not both), the solenoid 210 and its entire circuits may be omitted if desired.

What I claim is:

1. In a control device for a powered vehicle having an engine and control means therefor to establish the speed of the vehicle when operating on a roadway, the combination comprising; speed-regulating mechanism to position said control means for establishing the operating speed of the vehicle, said speed regulating mechanism including a servo-motor operatively connected to said control means for actuation thereof, a source of energy for said servo-motor, said mechanism including pilot means to control the amount of said energy supplied to said servo-motor to cause speed-regulating movements thereof, said regulator mechanism also including sensing means responsive to changes in the speed of the vehicle to produce forces acting on said pilot means for causing operation thereof, automatic curve-compensation means responsive to changes in the roadway curvature and operatively associated with said regulating mechanism for effecting a change in the position of said servo-motor to automatically cause the vehicle-speed to reduce from the said operating speed by an amount varying as a function of the increase in roadway curvature, and to automatically cause said servo-motor to return to its original position for returning the vehicle speed to said operating speed gradually as the roadway curvature diminishes to zero.

2. In a speed control device for an automotive vehicle including an engine having control means therefor normally advanced to increase vehicle-speed, and conversely, when operating on roads and highways, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, and automatic curve-compensation means responsive to changes in the road curvature in any direction and operatively associated with said regulator mechanism to effect a change in the position of at least one speed-regulating element thereof for automatically causing the vehicle-speed to reduce from said regulated speed by an amount varying as a function of the increase in road curvature, and for automatically causing said element to return to its original position for returning the vehicle-speed to said regulated speed gradually as the road curvature diminishes to zero.

3. In a speed control device for an automotive vehicle including an engine having control means therefor normally advanced to increase vehicle-speed, and conversely, when operating on roads and highways, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, and automatic curve-compensation means including weight means responsive to changes in the centrifugal forces of said weight means produced by changes in the road curvature and operatively associated with said regulator mechanism to effect a change in the position of at least one speed-regulating element thereof for automatically causing the vehicle-speed to reduce from said regulated speed by an amount varying as a function of the increase in road curvature, and for automatically causing said element to return to its original position for returning the vehicle-speed to said regulated speed gradually as the road curvature diminishes to zero.

4. The combination of means defined in claim 1, and said automatic curve-compensation means including weight means operatively associated with said pilot means for effecting the operation thereof in response to an increase in the centrifugal forces of said weight means produced by an increase in the roadway curvature to cause the vehicle speed to reduce from said operating speed, and to cause said vehicle speed to return to said operating speed when said roadway curvature diminishes to zero.

5. A device for controlling the speed of an automotive vehicle having a driver-operated control member, the combination comprising; power-operated means operable to advance said control member when the vehicle speed is below a predetermined speed, spring means to retard said control member when the vehicle speed is above a predetermined speed, to provide automatic control of the speed of the vehicle and maintain it at said predetermined speed, said spring means also establishing a resistance to advancing movement of said control member when said vehicle is operating at said predetermined speed, said spring means further providing said resistance when the driver over-rides said automatic control by holding said control member at a position to effect operation of the vehicle at a speed above said predetermined speed, and means operable as a result of movement of said control member to release substantially instantaneously the entire force of said spring means to act on said control member in a retarding direction, for tactually advising the vehicle-driver suddenly and sharply that said vehicle is operating at said predetermined speed.

6. In a speed control device for an automotive vehicle including an engine and driver-operated control means therefor which is advanced or retarded to establish a predetermined speed of the vehicle, the combination comprising; a servo-motor adapted to affect the forces acting on said control means, a source of energy to operate said servo-motor in a direction to enable advancing movement of said control means, spring means acting on said servo-motor in a direction opposite from said first-named direction, pilot means responsive to a signal accompanying a change in vehicle speed to direct at least a portion of said energy to said servo-motor for causing movement thereof in said direction to enable said advancing movement of said control means, and means separate from said pilot means and operable as a result of advancing movement of said control means to appreciably decrease the amount of said energy acting on said servo-motor for enabling said spring means to act on said control means in a retarding direction with a corresponding appreciable force, to advise the vehicle-driver tactually that said predetermined speed has been attained.

7. In a speed control device for an automotive vehicle including an engine and driver-operated control means therefor which is advanced or retarded to establish a predetermined speed of the vehicle, the combination comprising; a pressure responsive member movable at least in a direction to enable advancement of said control means, a fluid circuit having a flow of fluid therethrough and communicating with said pressure responsive member, valve means in said circuit for controlling pressure therein acting on said pressure responsive member for causing said movement thereof in said first-named direction, spring means acting on said pressure responsive member to bias the forces produced thereby as a result of said last-named pressure and adapted to act on said control means in a direction to retard same, sensing means responsive to changes in a signal accompanying a change in vehicle-speed to provide forces acting on said valve means to cause said movements of said pressure responsive member, and second valve means operable as a result of advancement of said control means to appreciably change the pressure acting on said pressure responsive member for enabling said spring means to act on said control means in a retarding direction with a corresponding appreciable force to advise the driver tactually that the vehicle is operating at or above said predetermined speed.

8. In a speed control device for an automotive vehicle including an engine having control means therefor normally advanced to increase vehicle-speed, and conversely, and including vehicle brake-actuating means, the combination of; a speed control mechanism including means movable in response to a signal accompanying a change in vehicle speed to produce forces adapted to act on said control means, manually operated selector means operatively associated with said mechanism in a first position thereof for effecting application of said forces on said control means to automatically retard same when the vehicle speed exceeds a preselected value, and to automatically advance said control means when said vehicle speed is below said preselected value, to provide automatic control of the speed of the vehicle independent of manual operation by the vehicle-driver, said mechanism including means to cause application of said forces acting on said control means only in a direction tending to retard same when manually advanced by the vehicle-driver to produce a vehicle speed above said preselected speed, and said selector means in a second position thereof being adapted to preclude said application of said forces in either direction on said control means during both said automatic control operation and also when said preselected speed is exceeded, and means operated by said brake-actuating means to effect movement of said selector means from said first position to said second position.

9. In a speed control device for an automotive vehicle including an engine and a driver-operated control means therefor which is advanced or retarded to establish a predetermined cruising speed of the vehicle, the combination comprising; spring means disposed to act on said control means in a retarding direction to provide a sizable force which can be overpowered by the driver at any time, a servo-motor adapted to oppose the force of said spring means, a source of energy to opperate said servo-motor in a direction opposite from said first-named direction, pilot means responsive to a signal accompanying a change in vehicle speed to direct said energy to said servo-motor for overpowering the force of said spring means when the vehicle speed is less than said predetermined cruising speed, and means separate from said pilot means and operable when said vehicle is operating at or above said predetermined speed to appreciably decrease the amount of said energy acting on said servo-motor for enabling said spring means to act on said control means in a retarding direction with a corresponsing appreciable force, to advise the vehicle-driver tactually that said predetermined speed has been attained or exceeded.

10. A device for controlling the speed of an automotive vehicle having a driver-operated control member, the combination comprising; spring means disposed to act on said control member in a retarding direction with a force that can be overpowered by the driver at any time when the vehicle speed exceeds a predetermined speed, power-operated means operable to overpower said spring means when the vehicle speed is below said predetermined speed, the force of said spring means establishing a resistance to advancing movement of said control member when said vehicle is operating at said predetermined speed, said spring means further providing said resistance when the driver advances said control member to a position causing operation of the vehicle at a speed above said predetermined speed, and means operable either as a result of an advancing movement of said control member or upon attainment of said predetermined speed to release substantially instantaneously the entire force of said spring means to act suddenly on said control member in a retarding direction, for tactually advising the vehicle driver suddenly and sharply that the vehicle is operating at said predetermined speed.

11. In a control device for an automotive vehicle having an engine and drive-operated control means therefor which is advanced or retarded to establish the speed of the vehicle when driving on roads or highways, the combination comprising; mechanism including means responsive to vehicle speed and also including resistance means operatively associated with said speed-responsive means and adapted to act on said control means in a retarding direction when the vehicle speed is at or above a predetermined cruising speed for establishing a warning force comprising a resistance to advancing movement of said control means at said predetermined speed, said warning force being low enough for enabling said driver to overpower same at any time, said speed-responsive means and said resistance means being constructed and arranged also to provide said warning resistance force when the driver maintains said control means at a position to cause operation of the vehicle at a vehicle speed above said predetermined speed, said speed-responsive means including means adapted to cause said resistance means and its said warning force to be precluded from acting on said control means when the vehicle speed is less than said cruising speed, and automatic curve compensation means responsive to changes in the road curvature and operatively associated with said resistance means for effecting a change in the position of at least one element of said mechanism to automatically cause the vehicle speed at which said resistance occurs to reduce from the said predetermined speed by an amount varying as a function of the increase of said road curvature and to automatically cause said element to return to its original position for causing the vehicle speed at which said resistance occurs to return gradually to said predetermined cruising speed as the highway curvature diminishes to zero.

12. The combination of means defined in claim 11, and said resistance means comprising spring means adapted to act on said control means in a retarding direction for providing said speed-warning force which can be overpowered by the driver at any time, and said mechanism including a servo-motor adapted to oppose the forces of said spring means, a source of energy for operating said servo-motor in a direction opposite from said first-named direction, and said means included in said speed-responsive means comprising pilot means responsive to a signal accompanying a change in vehicle speed to direct at least a portion of said energy to said servo-motor for overpowering the force of said spring means when the vehicle speed is less than said predetermined cruising speed, and said pilot means acting to appreciably change the amount of said energy transmitted to said servo-motor when the vehicle operates at or above said predetermined cruising speed for enabling said spring means to act on said control means in a retarding direction with said warning force to advise the vehicle-driver tactually that said predetermined speed has been attained, and said curve-compensation means including movable weight means responsive to centrifugal forces produced by changes in the road curvature and operatively associated with an element of said mechanism for causing said servo-motor to effect said reduction of vehicle speed at which said resistance occurs when said road curvature increases, and conversely.

13. In a control device for an automotive vehicle having an engine and driver-operated control means therefor which is advanced or retarded to establish the speed of the vehicle when driving on roads or highways, the combination comprising; mechanism including means responsive to vehicle speed and also including resistance means operatively associated with said speed-responsive means and adapted to act on said control means in a retarding direction when the vehicle speed is at or above a predetermined cruising speed for establishing a warning force comprising a resistance to advancing movement of said control means at said predetermined speed, said warning force being low enough for enabling said driver to overpower same at any time, said speed-responsive means and said resistance means being constructed and arranged also to provide said warning resistance force when the driver maintains said control means at a position to cause operation of the vehicle at a vehicle speed above said predetermined speed, said speed-responsive means including means adapted to cause said resistance means and its said warning force to be precluded from acting on said control means when the vehicle speed is less than said cruising speed, said device being constructed and arranged to cause a change in the position of at least one element of said mechanism for enabling said resistance means to provide said resistance force during normal acceleration of the vehicle by the driver from a lower speed to said cruising speed only when the rate of acceleration equals or exceeds a predetermined value, said resistance means also being adapted to provide said resistance force when the driver positions said control means to produce a rate of vehicle acceleration in excess of said predetermined rate for inducing the driver to accelerate the vehicle at a moderate and safe rate, and said device being constructed and arranged to enable said predetermined speed or said predetermined acceleration rate to be exceeded in emergencies by the driver by overpowering said resistance force at any time.

14. The combination of means defined in claim 13, and said resistance means including spring means adapted to act on said control means in a retarding direction to provide said warning force, a servo-motor adapted to oppose the forces of said spring means, a source of energy for operating said servo-motor in a direction opposite from said first-named direction, said mechanism including pilot means responsive to a signal accompanying said changes in vehicle speed to direct at least a portion of said energy to said servo-motor for overpowering the force of said spring means when the vehicle speed is less than said predetermined cruising speed or when said predetermined acceleration rate has not been exceeded, and said pilot means acting to appreciably decrease the amount of said energy transmitted to said servo-motor when the vehicle operates at or above said predetermined cruising speed or when said predetermined acceleration rate has been exceeded, for enabling said spring means to act on said control means in a retarding direction with said resistance warning force to advise the vehicle-driver tactually that said predetermined speed has been attained or said predetermined rate of acceleration has been exceeded.

15. In a speed control device for an automotive vehicle including an internal combustion engine having an air intake passage and a driver-operated throttle operatively mounted therein producing a vacuum on the downstream side thereof which reduces as the throttle advances, and conversely, to establish the speed of the vehicle, the combination comprising; spring means adapted to act on said throttle in a retarding direction to provide a warning force which can be overpowered by the driver at any time, a pressure-responsive member adapted to oppose the force of said spring means, a vacuum circuit for the flow of air therethrough communicating with said pressure-responsive member on one side thereof and having its outlet communicating with said intake passage on the downstream side of said throttle, valve means in said circuit for controlling vacuum therein acting only on said one side of said pressure-responsive member for providing vacuum forces thereof in a direction opposite from said first named direction to bias said spring means, sensing means operable in response to a change in the speed of the vehicle to cause movement of said valve means for directing vacuum to said pressure-responsive member to preclude said speed-warning force when the vehicle speed is less than a predetermined cruising speed, and when the vehicle operates at or above said predetermined cruising speed to cause reverse movement of said valve means to appreciably decrease the amount of vacuum transmitted to said pressure-responsive member for enabling said spring means to act on said control means in a reduce-speed direction with said warning resistance force to advise the vehicle-driver tactually that said predetermined speed has been attained or exceeded, and said vacuum circuit and said spring means and said pressure-responsive member being constructed and arranged to provide a force of said spring means in relation to the size of said pressure-responsive member for enabling said spring means also to provide said warning force acting on said throttle whenever said passage vacuum acting on said pressure-responsive member falls below a minimum value as a result of excessive advancement of said throttle by the driver causing an excessive acceleration-rate during vehicle acceleration from a lower speed to the cruising speed, and said relation of the size of said pressure-responsive member to said spring means enabling said passage vacuum to cause said pressure-responsive member to overpower said spring means for precluding same from providing said warning force acting on said throttle whenever said passage vacuum increases above said minimum value as a result of moderate advancement of said throttle during said vehicle acceleration, and in which further excessive advancement of said throttle during said vehicle acceleration further reduces said intake passage vacuum acting on said pressure-responsive member for enabling said spring means to continue to act on said throttle as an acceleration-rate warning force for inducing the driver to restrict the rate of vehicle acceleration to a moderate value by limiting the throttle-opening to positions providing said moderate advancement for producing values of intake passage vacuum at or above said minimum value.

16. The combination of means defined in claim 15, and second valve means operatively associated with said circuit and operable at least when the vehicle is operating at or above the predetermined speed or at said moderate vehicle acceleration-rate to appreciably reduce the vacuum acting on said pressure-responsive member for enabling said spring means to act on said throttle in a retarding direction with a corresponding appreciable force, to advise the driver tactually that the vehicle is operating at or above said predetermined cruising speed or that the rate of vehicle acceleration is excessive, respectively.

17. The combination of means defined in claim 15, in which said vehicle operates on roads and highways, and automatic curve-compensation means responsive to changes in the road curvature and operatively associated with said vacuum circuit for affecting said pressure-responsive member to automatically cause the vehicle speed at which said warning force occurs to reduce from the said predetermined speed by an amount varying as a function of the increase in said road curvature, and to return gradually to said predetermined cruising speed as the road curvature gradually diminishes to zero.

18. In a control device for an automotive vehicle having an engine and control means therefor to establish the speed of the vehicle, said vehicle having an electric circuit including a starter for the engine and driver-operated switch means to close momentarily to energize said starter, the combination of; means to position said control means to establish the operating speed of the vehicle independent of foot pressure on said control means by the vehicle-driver, and restraining means including an electric device in said circuit operated by said starter switch means to automatically render said positioning means inoperative with respect to said control means when said switch means is momentarily closed by said driver.

19. In a control device for an automotive vehicle having an engine and control means therefor to establish the speed of the vehicle, said vehicle having an electric circuit including a starter for the engine and driver-operated switch means to close momentarily to energize said starter, said vehicle also including a door movable by the vehicle-driver in opening and closing directions, the combination comprising; means to position said control means to establish the operating speed of the vehicle, and restraining means including an electric powered device in said circuit operated by said starter switch means or by said door to automatically render said positioning means inoperative with respect to said control means when said switch means is momentarily closed or when said door is moved by the driver, respectively.

20. In a control device for an automotive vehicle having an engine and control means therefor to establish the speed of the vehicle, said vehicle having an electric circuit including a starter for the engine and driver-operated switch means to momentarily energize said starter, said vehicle also including second switch means in said circuit operated by the door when opened, the combination comprising; means to position said control means to establish the operating speed of the vehicle, restraining means including an electric powered device in said circuit operated by said starter switch means or said door switch means to automatically render said positioning means inoperative with respect to said control means when said starter switch means is momentarily operated or when said door is opened to operate said door switch means, respectively, and rectifier means in said circuit to preclude current to said starter through said door switch means but to pass current to said electric device through said starter switch means whenever same is operated by the driver to energize said starter.

21. In a control device for an automotive vehicle having an engine and control means therefor to establish the speed of the vehicle, said vehicle having a transmission control member and an electric circuit including a starter for the engine and driver-operated switch means to momentarily energize said starter, said vehicle also including second switch means in said circuit operated by the transmission control member when actuated by the vehicle-driver, the combination comprising; means to position said control means to establish the operating speed of the vehicle, restraining means including an electric powered device in said circuit operated by said starter switch means or said second switch means to automatically render said positioning means inoperative with respect to said control means when said starter switch means is momentarily operated or when said transmission control member is actuated by the driver to operate said transmission switch means, respectively, and rectifier means in said circuit to preclude current to said starter through said transmission switch means but to pass current to said electric device through said starter switch means whenever same is operated by the driver to energize said starter.

22. In a speed control device for an automotive vehicle including an engine having control means therefor normally advanced to increase vehicle-speed, and conversely, and including vehicle brake-actuating means, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, means operated by said brake-actuating means upon normal movements thereof rendering said regulator mechanism inactive but not inoperative to transmit said forces to said control means, activating means operatively associated with said mechanism and operable selectively by the vehicle-driver at his discretion when said brake-actuating means is inactive to automatically effect activation of said mechanism with respect to said control means, said selective activation being effected at a vehicle speed substantially lower than said regulated speed, said regulator mechanism being adapted to effect automatic acceleration of the vehicle from said lower speed to said regulated speed and tending automatically to maintain said preselected regulated speed thereafter, and said device including means automatically operable temporarily for affecting operation of said control means to restrict the rate of said automatic acceleration.

23. In a speed control device for an automotive vehicle including an engine having control means therefor normally advanced to increase vehicle-speed, and conversely, and including vehicle brake-actuating means, the combination of; a regulator mechanism operatively associated with said control means and adapted to produce forces acting thereon in response to a signal accompanying a change in the speed of the vehicle to effect stable automatic regulating movements of said control means in a direction tending to maintain a preselected regulated speed of the vehicle, means operated by said brake-actuating means upon normal movements thereof for rendering said regulator mechanism inactive but not inoperative to transmit said forces to said control means, activating means operatively associated with said mechanism and operable selectively by the vehicle-driver at his discretion when said brake-actuating means is inactive to automatically effect activation of said mechanism with respect to said control means, said selective activation being effected at a vehicle speed substantially lower than said regulated speed, said regulator mechanism being constructed and arranged to cause automatic acceleration of the vehicle from said lower speed to said regulated speed and tending automatically to maintain said preselected regulated speed thereafter, and acceleration restricting means operatively associated with said mechanism and operable at least upon attaining said lower speed at said automatic activation for affecting operation of said control means to restrict the rate of acceleration during the period of said automatic acceleration, and said acceleration restricting means including means to terminate the acceleration-restricting action when substantially said regulated speed is attained.

24. In a speed control device for an automotive vehicle including an engine having control means therefor normally advanced to increase vehicle-speed, and conversely, and including vehicle brake-actuating means, said vehicle also including an element manually movable by the vehicle-driver incident to normal operation of the vehicle, the combination comprising; a regulator mechanism for effecting automatic regulating movements of said control means in a direction tending to maintain a preselected vehicle speed, said regulator mechanism including a pressure-responsive member operatively connected to said control means to transmit forces thereto for causing said speed-regulating movements thereof, a fluid circuit having a flow of fluid therethrough and communicating with said pressure-responsive member, said mechanism including valve means in said circuit for controlling fluid pressure therein acting on said pressure-responsive member for causing said movements thereof, sensing means responsive to changes in a signal accompanying a change in vehicle speed to produce forces acting on said valve means for effecting said speed-regulating movements of said control means, means operated by said brake-actuating means upon normal movements thereof for rendering said regulator mechanism inactive but not inoperative to transmit said forces to said control means, activating means operatively associated with said mechanism and operable selectively by the vehicle-driver at his discretion when said brake-actuating means is inactive to automatically effect activation of said mechanism with respect to said control means, said selective activation being effected at a vehicle speed substantially lower than said regulated speed, said regulator mechanism being adapted to effect automatic acceleration of the vehicle from said lower speed to said regulated speed and tending automatically to maintain said preselected regulated speed thereafter, acceleration restricting means operable to cause a change in the pressure acting on said pressure-responsive member for repositioning said control means in a reduce-speed direction to restrict the rate of said automatic acceleration during operation thereof, said restricting means including means operable when substantially said regulated speed is attained to restore said last-named pressure for terminating said acceleration restricting action, and restraining means automatically operable in response to movement of said element for rendering said mechanism inoperative.

25. The combination of means defined in claim 23, and said acceleration restricting means including inertia weight means operable as a function of the rate of said automatic acceleration to cause said restriction of said rate until substantially said regulated speed is attained.

26. The combination of means defined in claim 23, and a servo-motor adapted to be operatively connected to said control means for providing said forces acting thereon for activation thereof, a source of energy for operating said servo-motor, pilot means responsive to changes in said signal for directing at least a portion of said energy to said servo-motor for causing said automatic speed-regulating movements of said control means, and said restricting means including inertia weight means operatively associated with said servo-motor means of affecting operation of said control means to restrict the rate of acceleration during the period of said automatic acceleration.

27. The combination of means defined in claim 24, and said acceleration restricting means including inertia weight means and also including second valve means operatively associated with said circuit and operated by said weight means in response to the rate of said automatic acceleration to cause said pressure-change acting on said pressure-responsive member until substantially said regulated speed is attained.

28. The combination of means defined in claim 24, and said acceleration restricting means including second valve means operatively associated with said circuit, and said restricting means also including means operating at least when said automatic acceleration commences upon said selective activation for causing temporary movement of said second valve means from a first position to a second position to cause said pressure-change acting on said pressure-responsive member and to return said valve means to said first position when substantially said regulated speed is attained.

29. In a speed control device for an automotive vehicle including an engine having control means therefor normally advanced to increase vehicle-speed, and conversely, and including vehicle-brake actuating means, said vehicle also including a movable element always operated by the vehicle-driver incident to normal operation of the vehicle, the combination comprising; a regulator mechanism operatively associated with said control means and adapted to produce forces acting thereon in response to a signal accompanying a change in the speed of the vehicle to effect stable automatic regulating movements of said control means in a direction tending to maintain a preselected regulated speed of the vehicle, release means operated by said brake-actuating means upon normal movements thereof for rendering said regulator mechanism inactive but not inoperative to transmit said forces to said control means, activating means operatively associated with said mechanism and operable selectively by the vehicle-driver at his discretion after partial manual advancement of said control means when said brake-actuating means is inactive to effect activation of said mechanism with respect to said control means, said activating means including operating means causing activation of said regulator mechanism, carriage means axially movable manually by the vehicle-driver from a first position to a second position for enabling operation of said operating means, flexible shaft means operatively connecting said carriage means and said operating means, said flexible shaft means including said release means operatively associated with said brake-actuating means for causing movement of said shaft means in relation to said carriage means when said brake-actuating means is operated and said carriage means stands in said second position, means to maintain said carriage means in said second position for enabling said relative movement of said shaft means, lost-motion means including spring means connecting said carriage means and said flexible shaft means for enabling said relative movement of said flexible shaft means caused by operation of said brake-actuating means while said carriage means is maintained in said second position for temporarily inactivating said operating means, said lost-motion spring means also being operable when said carriage means stands in said second position and upon release of said brake-actuating means to cause a return movement of said shaft means to enable automatic selective reactivation of said mechanism, second spring means acting on said carriage means and urging same into said first position, and restraining means operatively associated with said maintaining means and automatically operable in response to movement of said element and affecting said maintaining means for causing said carriage means to return to said first position for rendering said mechanism inoperative.

30. The combination of means defined in claim 29, and said vehicle element comprising a door manually operated by the vehicle-driver in opening and closing directions, and said maintaining means including mechanical latch means for holding said carriage means in said second position opposed by said second spring means, and said restraining means being operatively associated with said latch means for releasing said carriage means for automatic movement to said first position when said door is opened, whereby said carriage means must be moved deliberately by the vehicle-driver into said second position when operation of said regulator mechanism is again desired.

31. The combination of means defined in claim 29, and said carriage means including a manually rotatable portion, said regulator mechanism including speed-adjusting means for causing any desired regulated speed to be maintained, and means operated by said rotatable portion when manually rotated by the vehicle-driver and operatively connected to said speed-adjusting means for establishing any desired position thereof upon selective manual rotation of said rotatable portion.

32. A device for controlling the speed of an automotive vehicle having a driver-operated control member, the combination comprising; biasing means disposed to act on said control member in a retarding direction with a force than can be overpowered by the driver at any time when the vehicle attains a predetermined speed, power-operated means operable to overpower said biasing means when the vehicle speed is below said predetermined speed, the force of said biasing means establishing a resistance to advancing movement of said control member when said vehicle is operating at said predetermined speed, said biasing means further providing said resistance force when the driver advances said control member to a position causing operation of the vehicle at a speed above said predetermined speed, and means operatively associated with said power-operated means to enable temporary and intermittent application of said force of said biasing means to provide a pulsating force acting on said control member in a retarding direction when the vehicle operates at said predetermined speed, for tactually advising the vehicle-driver that the vehicle speed corresponds to said predetermined speed.

33. In a speed control device for an automotive vehicle including an engine having control means therefor normally advanced to increase vehicle speed, and conversely, and including vehicle brake-actuating means, said vehicle also including an element manually movable by the vehicle-driver incident to normal operation of the vehicle, the combination comprising; a regulator mechanism for effecting automatic regulating movements of said control means in a direction tending to maintain a preselected regulated vehicle speed, said regulator mechanism including a servo-motor operatively connected to said control means to transmit forces thereto for actuation thereof, a source of energy for said servo-motor, said mechanism including pilot means to control the amount of said energy supplied to said servo-motor to cause speed-regulating movements thereof, said regulator mechanism also including sensing means responsive to changes in the speed of the vehcile to produce forces acting on said pilot means for causing operation thereof, means operated by said brake-actuating means upon normal movements thereof for rendering said regulator mechanism inactive to transmit said forces to said control means, restraining means automatically operable in response to movement of said element for rendering said mechanism inoperative, and automatic curve-compensation means responsive to changes in the road curvature and operatively associated with said regulator mechanism for effecting a change in the position of at least said servo-motor to automatically cause the vehicle speed to reduce from said preselected speed by an amount varying as a function of the increase of road curvature, and to automatically cause said servo-motor to return to its original position for returning the vehicle speed to said preselected value gradually as the road curvature diminishes to zero.

34. The combination of means defined in claim 33, and said brake-actuating means in said normal movements thereof being adapted to render said mechanism only inactive but not inoperative with respect to said control means, and activating means operatively associated with said mechanism and operable selectively by the vehicle-driver at his discretion when said brake-actuating means is inactive to effect activation of said mechanism with respect to said control means, said selective activation being effected at a vehicle speed substantially lower than said regulated speed, said regulator mechanism being constructed and arranged to effect automatic acceleration of the vehicle from said lower speed to said regulated speed and tending automatically to maintain said preselected regulated speed thereafter.

35. The combination of means defined in claim 33, and said source of energy comprising a source of fluid pressure, a fluid circuit communicating with said fluid pressure source ot cause a flow of fluid through said circuit, and said servo-motor including a pressure-responsive member communicating with said circuit and operatively connected to said control means to effect movements thereof as a result of changes in pressure in a portion of said circuit, and said pilot means comprising valve means controlling pressures in said circuit-portion for causing speed-regulating movements of said control means in response to changes in said sensing means forces, and said automatic curve-compensation means including weight means operatively associated with an element of said fluid circuit to cause changes in pressure in said circuit-portion for effecting said change in position of said pressure-responsive member in response to an increase in the centrifugal forces of said weight means produced by an increase in the road curvature to cause said automatic reduction of the vehicle speed from said preselected speed, and to cause said automatic return of said pressure-responsive member to its original position for causing the vehicle speed to return to said preselected value when said road curvature diminishes to zero.

36. The combination of means defined in claim 33, and said source of energy comprising a source of fluid pressure, a fluid circuit communicating with said fluid pressure source to cause a flow of fluid through said circuit, and said servo-motor including a pressure-responsive member communicating with said circuit and operatively connected to said control means to effect movements thereof as a result of changes in pressure in a portion of said circuit, and said pilot means comprising valve means controlling pressures in said circuit-portion for causing speed-regulating movements of said control means in response to changes in said sensing-means forces, and said automatic curve-compensation means including weight means operatively connected to said valve means for changing the position thereof to cause a corresponding change in pressure in said circuit-portion for effecting said change in position of said pressure-responsive member in response to an increase in the centrifugal forces of said weight means produced by an increase in the road curvature to cause said automatic reduction of the vehicle speed from said preselected speed, and to cause said automatic return of said pressure-responsive member to its original position for causing the vehicle speed to return to said preselected value when said road curvature diminishes to zero.

37. The combination of means defined in claim 7, and fluid orifice means operatively associated with said second valve means for providing a controlled bleed of said source pressure to said pressure-responsive member when the vehicle-speed reduces slightly below said predetermined speed for causing said pressure-responsive member to overpower said spring means for reducing said resistance force sufficiently to enable the driver's foot to slightly advance said control means, said first-named valve means being constructed and arranged when said predetermined speed is again attained or exceeded to cause said pressure acting on said pressure-responsive member to change sufficiently to enable said spring means again to increase said resistance force, for providing a continuously repeating cycle to cause said tactual resistance force acting on the driver's foot to pulsate when said driver maintains the vehicle speed substantially at said predetermined speed.

38. The combination of means defined in claim 9, and said source of energy comprising a source of fluid pressure, a fluid circuit having two restrictions therein and communicating with said fluid pressure source to cause a flow of fluid through said circuit, and said servo-motor including a pressure-responsive member communicating on one side thereof with said circuit at a point between said two restrictions, said pilot means comprising valve means operatively associated with at least one of said restrictions to vary the restrictive effect thereof in response to changes in said signal for modulating pressure between said two restrictions acting on said one side of said pressure-responsive member, second spring means biasing said valve means, and said means separate from said pilot means including second valve means for changing said pressure in said fluid circuit for enabling said first-named spring means to act on said control means in said retarding direction.

39. In a control device for an automotive vehicle having an engine and driver-operated control means therefor which is advanced or retarded to establish the speed of the vehicle when driving on roads or highways, the combination comprising; servo-motor means adapted to act on said control means in a retarding direction when the vehicle speed is at or above a predetermined cruising speed for establishing a warning force comprising a resistance to advancing movement of said control means at said predetermined speed, a source of energy for operating said servo-motor means, pilot means responsive to a signal accompanying a change in vehicle speed to control the amount of said energy transmitted to said servo-motor for precluding said retarding warning force from acting on said control means when the vehicle speed is less than said predetermined cruising speed, said pilot means acting to cause a change in the amount of said energy transmitted to said servo-motor means when the vehicle operates at or above said predetermined cruising speed, for causing said resistance warning force to act on said control means in said retarding direction to advise the vehicle-driver tactually that said predetermined speed has been attained, said warning force being of sufficient magnitude to enable said driver to overpower same at any time, and automatic curve-compensation means responsive to changes in the road curvature and operatively associated with said servo-motor means to automatically effect a repositioning thereof for causing the vehicle-speed at which said resistance occurs to reduce from the said predetermined speed by an amount varying as a function of the increase of said road curvature, and to automatically cause said servo-motor means to return to its original position for causing the vehicle-speed at which said resistance occurs to return gradually to said predetermined cruising speed as the road curvature diminishes to zero.

40. The combination of means defined in claim 39, and said source of energy comprising a source of fluid pressure, and said servo-motor means including a pressure-responsive member, a fluid circuit communicating with said pressure source to cause a flow of fluid therethrough and communicating with said pressure-responsive member, said pilot means comprising valve means for controlling pressures in a portion of said circuit acting on said pressure-responsive member, and said curve-compensation means including movable weight means responsive to centrifugal forces thereof produced by changes in the road curvature and operatively associated with an element of said fluid circuit to cause a change in said pressures in said circuit-portion for effecting said changes in the position of said pressure-responsive member to cause said reduction of vehicle speed when said road curvature increases, and conversely.

41. In a control device for an automotive vehicle having an engine and control means therefor to establish the speed of the vehicle, said vehicle having an electric circuit including a starter for the engine and driver-operated switch means to close momentarily to energize said starter, and said vehicle including vehicle brake-actuating means, said vehicle also including an element manually movable by the vehicle-driver incident to normal operation of the vehicle, the combination comprising; a regulator mechanism for effecting automatic regulating movements of said control means in a direction tending to maintain a preselected vehicle speed, said regulator mechanism including a servo-motor operatively connected to said control means for actuation thereof, a source of energy for said servo-motor, said mechanism also including pilot means to control the amount of said energy supplied to said servo-motor to cause speed-regulating movements thereof, said regulator mechanism including sensing means responsive to changes in the speed of the vehicle to produce forces acting on said pilot means for causing operation thereof, means operated by said brake-actuating means upon normal movements thereof for rendering said regulator mechanism inactive, and restraining means including an electric device in said circuit operated either by said momentary closing of said starter switch means or by said movement of said element to automatically render said positioning means inoperative with respect to said control means.

42. In a speed control device for an automotive vehicle including an engine having control means therefor normally advanced to increase vehicle-speed, and conversely, and including vehicle brake-actuating means, said vehicle including an element manually movable by the vehicle-driver incident to normal operation of the vehicle, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, linkage means operatively connected to said mechanism for transmitting said forces to said control means to effect said speed-regulating movements thereof, said linkage means including movable latch means providing an abutting connection between said regulator mechanism and said control means for effectively transmitting said forces and movements to said control means, said linkage means including means operatively associated with said control means to establish said abutting connection upon advancement of said control means, release means operatively associated with said brake-actuating means and operable as a result of said predetermined movement thereof to cause movement of said latch means for temporarily disconnecting said abutting connection to render said regulator mechanism inactive but not inoperative with respect to said control means, and restraining means operatively associated with said latch means and automatically operated as a result of movement of said element in one direction for causing movement of said latch means to permanently disconnect said abutting connection for rendering said regulator mechanism inoperative with respect to said control means, and for precluding activation of said mechanism after said element is moved in a direction reverse from said first-named direction until said mechanism is intentionally activated by the vehicle-driver.

43. The combination of means defined in claim 42, and said release means comprising flexible shaft means including a sheath and a flexible shaft slidable in said sheath, means to secure one end of said sheath to said linkage means adjacent said latch means, means to secure the other end of said sheath to a fixed portion of said vehicle adjacent said brake-actuating means, one end of said flexible shaft being adapted to be operatively connected to said latch means, the other end of said flexible shaft being operatively connected to said brake-actuating means and operable upon said predetermined movement thereof for causing said movement of said latch means to temporarily disconnect said abutting connecting for rendering said regulator mechanism inactive but not inoperative with respect to said control means.

44. The combination of means defined in claim 24, and said fluid in said circuit comprising air subjected to a pressure-differential to cause a flow of air through said circuit, an air passage communicating with said circuit-pressure acting on said pressure-responsive member and with the surrounding atmosphere, said acceleration-restricting means including valve means having a movable valve portion cooperating with said passage to preclude air-flow therethrough when said valve portion resides in a steady-speed position, said restricting means also including weight means acting on said valve portion and operable in response to inertia forces thereof produced as a result of said automatic acceleration for causing movement of said valve portion out of said steady-speed position to open said passage to the atmosphere gradually as a function of said rate of said automatic acceleration for causing said change in said circuit-pressure acting on said pressure-responsive member, and said weight means being adapted to cause said valve portion to return to said steady-speed position when said preselected speed is attained after said first-named valve means causes said pressure-responsive member to retard said control means for terminating said automatic acceleration, and for maintaining said regulated speed thereafter.

45. The combination of means defined in claim 23, and a servo-motor adapted to be operatively connected to said control means for providing said forces acting thereon for activation thereof, a source of energy for operating said servo-motor, pilot means responsive to changes in said signal for directing at least a portion of said energy to said servo-motor for causing said automatic speed-regulating movements of said control means, said acceleration restricting means including means operatively associated with said servo-motor for affecting operation of said control means to restrict the rate of acceleration during the period of said automatic acceleration, and said means causing said selective activation being operable selectively by said vehicle-driver at his discretion.

46. In a speed-regulating device for a machine having control means to regulate the speed thereof, the combination comprising; a pressure-responsive member operatively connected to said control means for actuation thereof, a fluid circuit having a source of pressure fluid to produce a flow of fluid therethrough and communicating with said pressure-responsive member, valve means including only a single fixed portion in said circuit for controlling pressure therein acting on said pressure-responsive member for effecting regulating movements thereof, said valve means including only a single leaf spring swingable means having a valve portion adapted for substantially frictionless reciprocal movements in one path of travel and cooperating with said fixed valve portion to control said circuit pressure acting on said pressure-responsive member, means securing said leaf spring means substantially at one end thereof to a fixed portion of said device with substantially its free end including said valve portion and disposed for said substantially frictionless movements, means providing a fluid pressure varying as a function of the speed of said machine, pressure-sensitive means including diaphragm means responsive to changes in said last-named pressure to provide forces varying as a function of the speed of said machine and acting on said swingable means to cause movements thereof for effecting said speed-regulating movements of said pressure-responsive member and said control means, said valve means including a member having substantially frictionless operative connection with said diaphragm means and said leaf spring means for enabling said diaphragm means to transmit said forces to said leaf spring means for causing substantially frictionless cooperative speed-regulating movements of said leaf spring means and said member and said diaphragm means in response to changes in said speed-varying pressure.

47. The combination of means defined in claim 46, and said machine comprising an automotive vehicle including an internal combustion engine having an intake passage for the flow of air therethrough, and in which said control means includes a throttle operatively mounted in said passage whereby a reduction of the opening of said throttle progressively increases the vacuum in said passage on the downstream side of the throttle, and conversely, said vehicle having brake-actuating means, and release means operated by said brake-actuating means upon normal movements thereof to render said regulating device inactive with respect to said throttle, said fluid circuit including inlet and outlet restrictions therein, said circuit communicating with said pressure-responsive member on one side thereof at a point between said two restrictions and having its outlet communicating with said intake passage on the downstream side of the throttle, said inlet restriction including said fixed valve portion and also said movable valve portion to vary the restrictive effect of said inlet restriction for controlling vacuum in said circuit between said two restrictions tending to cause movements of said pressure-responsive member in a direction to open said throttle, and biasing means acting on said pressure-responsive member in a direction tending to close said throttle to oppose the forces produced by said last-named controlled vacuum.

48. The combination of means defined in claim 6, and linkage means operatively connecting said servo-motor and said control means for transmitting thereto said forces of said spring means, said linkage means including movable latch means providing an abutting connection between said servo-motor and said control means for effecting said transmission of said forces, and release means to cause movement of said latch means for disconnecting said abutting connection to preclude said forces from acting on said control means when said vehicle is operating at or above said predetermined speed.

References Cited

UNITED STATES PATENTS

| | | | |
|---|---|---|---|
| 2,289,014 | 7/1942 | Howard | 137—45 X |
| 2,302,322 | 11/1942 | Howard | 123—99 |
| 2,737,165 | 3/1956 | Thorner | 123—103 |
| 2,990,825 | 7/1961 | Fuller et al. | 180—106 |
| 3,305,042 | 2/1967 | Thorner | 180—106 |
| 2,016,864 | 10/1935 | Lange. | |
| 2,671,542 | 3/1954 | Robnett. | |
| 2,708,979 | 5/1955 | Reynoldson. | |
| 2,916,100 | 12/1959 | Teeter. | |
| 2,972,391 | 2/1961 | Faiver et al. | 180—108 |
| 3,100,021 | 8/1963 | Maurer et al. | |
| 3,109,507 | 11/1963 | McMurray et al. | 180—109 |

FOREIGN PATENTS 735,412  8/1955  Great Britain.

KENNETH H. BETTS, Primary Examiner

U.S. Cl. X.R.

180—106